US009230138B2

(12) United States Patent
Sato

(10) Patent No.: US 9,230,138 B2
(45) Date of Patent: Jan. 5, 2016

(54) INFORMATION PROCESSING METHOD AND APPARATUS FOR SECURELY SHARING PERSONALIZED INFORMATION

(75) Inventor: Masayuki Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1254 days.

(21) Appl. No.: 12/971,015

(22) Filed: Dec. 17, 2010

(65) Prior Publication Data

US 2011/0085192 A1  Apr. 14, 2011

Related U.S. Application Data

(63) Continuation of application No. 11/460,001, filed on Jul. 26, 2006, now abandoned.

(30) Foreign Application Priority Data

Jul. 27, 2005 (JP) ................... 2005-217395

(51) Int. Cl.
*G06F 7/04* (2006.01)
*G06F 21/82* (2013.01)
*G06F 21/62* (2013.01)
*G06F 21/31* (2013.01)

(52) U.S. Cl.
CPC .............. *G06F 21/82* (2013.01); *G06F 21/31* (2013.01); *G06F 21/6218* (2013.01); *G06F 2221/2143* (2013.01)

(58) Field of Classification Search
CPC ................................ H04L 63/08; G06F 21/82
USPC ............................................................ 726/2
See application file for complete search history.

(56) References Cited

U.S. PATENT DOCUMENTS 5,726,883 A  3/1998 Levine et al.
6,560,369 B1  5/2003 Sato
(Continued)

FOREIGN PATENT DOCUMENTS

JP  9-190410  7/1997
JP  11-017862  1/1999
JP  2004-312302  11/2004

OTHER PUBLICATIONS

Yoonsang Change et al., "Utrasonic Cleaning of Used Plastic Parts for Remanufacturing of Multifunctional Digital Copier," International Journa of precision engineering and manufacturing vol. 14, No. 7, pp. 951-956, Springer, Jun. 2013.*

(Continued)

*Primary Examiner* — Luu Pham
*Assistant Examiner* — Canh Le
(74) *Attorney, Agent, or Firm* — Fitzpatrick, Cella, Harper & Scinto

(57) ABSTRACT

There is disclosed an apparatus capable of suitably deleting information of, e.g., an operation environment that is personalized in a given apparatus and handled in another apparatus and remains in it, thereby improving the operability and security. An information processing apparatus receives personalized information set in another information processing apparatus and stores the personalized information. A user who requests access to the stored personalized information is authenticated. A user who has passed authentication can obtain an operation environment based on the personalized information. Upon logout of the user or after the elapse of a predetermined time after access, the stored personalized information is erased.

15 Claims, 38 Drawing Sheets

(56) References Cited

U.S. PATENT DOCUMENTS

| | | |
|---|---|---|
| 6,674,537 B2 | 1/2004 | Kadowaki |
| 6,926,199 B2 * | 8/2005 | Jay et al. .................. 235/375 |
| 6,947,182 B1 | 9/2005 | Kumagai |
| 7,031,506 B2 | 4/2006 | Tsujii et al. |
| 7,124,185 B2 | 10/2006 | Kuroyanagi |
| 7,154,618 B2 | 12/2006 | Kadowaki |
| 7,523,199 B2 | 4/2009 | Tsuyama et al. |
| 7,612,904 B2 | 11/2009 | Kadowaki |
| 7,694,137 B2 | 4/2010 | Matsuya |
| 2001/0037390 A1 * | 11/2001 | Kuroyanagi ................. 709/225 |
| 2002/0145627 A1 | 10/2002 | Whitmarsh et al. |
| 2003/0084050 A1 | 5/2003 | Hall et al. |
| 2004/0012812 A1 * | 1/2004 | Shimizu .................. 358/1.15 |
| 2004/0196486 A1 | 10/2004 | Uchino |
| 2005/0002057 A1 | 1/2005 | Oe |
| 2005/0005242 A1 | 1/2005 | Hoyle |
| 2005/0185215 A1 | 8/2005 | Nishizawa et al. |
| 2005/0185216 A1 | 8/2005 | Mitsuhashi et al. |
| 2005/0185217 A1 | 8/2005 | Nishizawa et al. |
| 2005/0200885 A1 | 9/2005 | Nishizawa et al. |
| 2005/0213802 A1 | 9/2005 | Tsujii et al. |
| 2009/0310148 A1 | 12/2009 | Kadowaki |

OTHER PUBLICATIONS

M. V. Mathews and Joan E. Miller, "Computer Editing, Typesetting and image generation," Proceedings—Fall Joint Computer Conference, 1965, pp. 389-398.*

* cited by examiner

F I G. 20
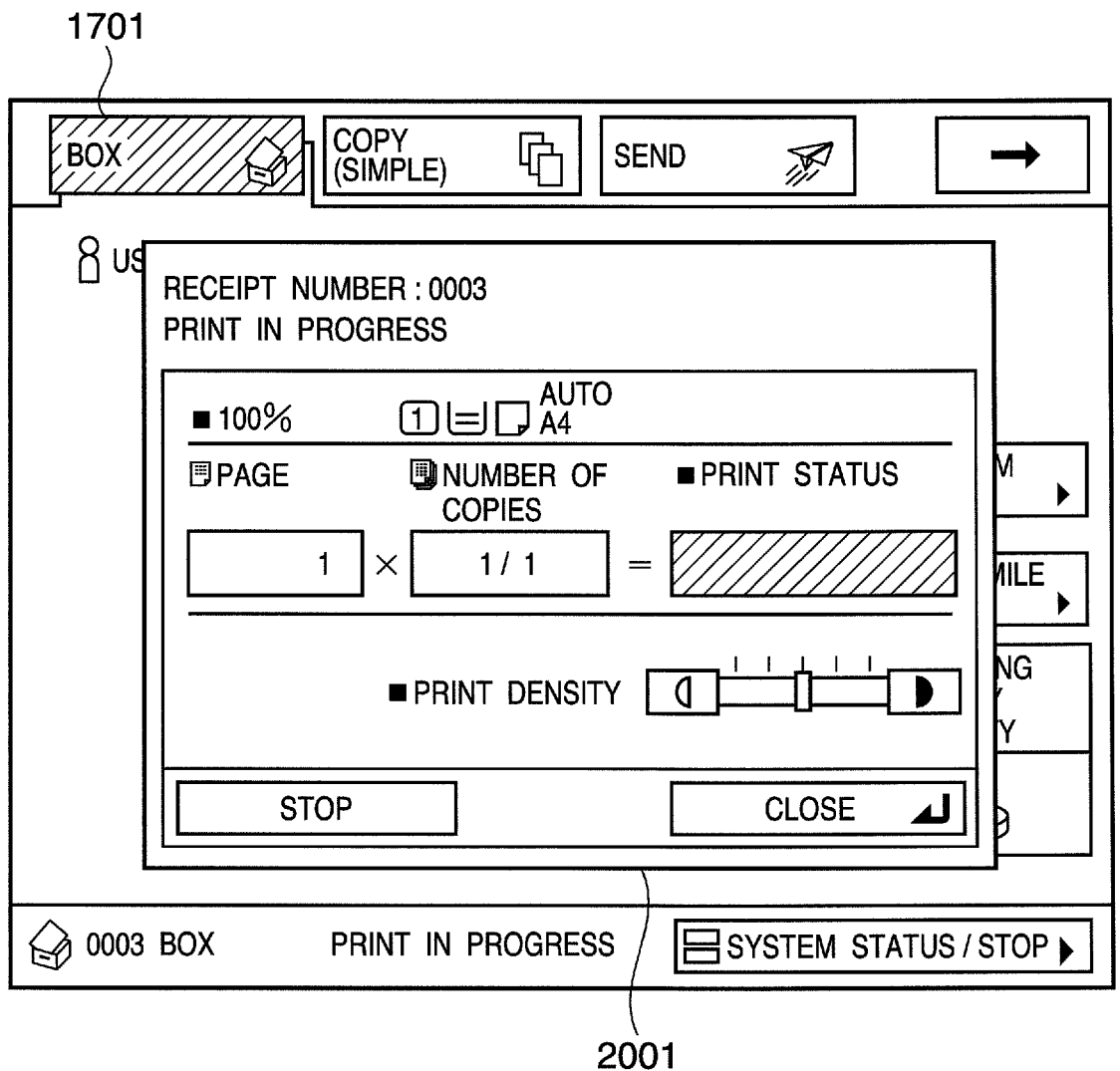

FIG. 22

ADDRESS TABLE — 2101, 2201

NUMBER OF ADDRESS: 0

■ ADDRESS TABLE: MY ADDRESS TABLE 1 ▼
■ ADDRESS TYPE: ● ALL ▼

| ∨ | TYPE | NAME | ADDRESS |
|---|------|------|---------|
| ☐ | ☐ | SATO | test.sato@ca···.co.jp |
| ☐ | ☐ | SUZUKI | test.suzuki@ca···.co.jp |

◀ 1/1 ▶

| A | KA | SA | TA | NA | HA | MA | YA.. | A-Z | 0-9 | ALL |

DETAILED INFORMATION ▲

CANCEL    OK

■ SYSTEM STATUS / STOP ▲

| SYSTEM USER ID | USER ID | PASSWORD |
|---|---|---|
| 00001 | satom | 2727 |

| | 2802 | 2803 | 2804 | 2805 |
|---|---|---|---|---|
| 2801 | BOX NUMBER | SYSTEM USER ID | BOX NAME | USE AMOUNT |
| | 00 | 00001 | | 1 |
| | 01 | 00001 | | 1 |

| BOX NUMBER | RECEIPT NUMBER | DOCUMENT NAME | PAPER SIZE | PAGE | DATE / TIME |
|---|---|---|---|---|---|
| 00 | 00001 | 20050603 PROCEEDINGS | A4 | 1 | 20050602164710 |
| 00 | 00002 | DRAWING 1 | A4 | 1 | 20050602164710 |
| ... | | | | | |

F I G. 30

| ADDRESS NUMBER | ADDRESS Gr | NAME | ADDRESS |
|---|---|---|---|
| 00001 | 01 | MASAYUKI SATO | test.sato@ca···.co.jp |
| 00001 | 01 | MR. SUZUKI, CHIEF | test.suzuki@ca···.co.jp |
| ⋯ | | | |

FIG. 31

| DEVICE NUMBER | DEVICE NAME | GROUP NUMBER | DOMAIN NUMBER | IP ADDRESS | SECURITY ID |
|---|---|---|---|---|---|
| 00001 | MFP0001 | | | 31x.31.31.01 | 00001 |
| 00002 | MFP0002 | | | 31x.31.31.02 | 00001 |

FIG. 32

| SYSTEM USER ID | SECURITY ID | CUSTOMIZED ID | DISPLAY ORDER | CUSTOMIZATION TYPE | CUSTOMIZATION STATE |
|---|---|---|---|---|---|
| 00001 | 00001 | 00001 | 0 | BOX SETTING | ON |
| 00001 | 00001 | 00001 | 1 | ADDRESS TABLE SETTING | ON |
| 00001 | 00001 | 00001 | 5 | BOARD MEMORY SETTING | ON |
| ... | | | | | |

| SYSTEM USER ID | SECURITY ID | SECURITY TYPE | ERASE TIME |
|---|---|---|---|
| 00001 | 00001 | AUTOMATIC ERASE UPON LOGOUT | 0 |

| SYSTEM USER ID | SECURITY ID | ACCESS PERMISSION KEY | TYPE | STATE |
|---|---|---|---|---|
| 00001 | 00001 | 9jKa32OENedd | SEND | END OF SEND |

3401, 3402, 3403, 3404, 3405, 3406

INFORMATION PROCESSING METHOD AND APPARATUS FOR SECURELY SHARING PERSONALIZED INFORMATION

This application is a continuation of U.S. patent application Ser. No. 11/460,001, filed Jul. 26, 2006.

BACKGROUND OF THE INVENTION

1. Field of the Invention

The present invention relates to an information processing method and apparatus for securely sharing personalized information.

2. Description of the Related Art

A current information processing apparatus (image processing apparatus) such as a digital multifunctional peripheral (MFP) has a number of functions. Examples of the functions are copying, printing from a personal computer (PC), mail send of documents scanned by a scanner, and storage of scanned documents. A user often saves the information of high frequently operation environments to improve the operability in using these functions of the image processing apparatus. For example, mail address tables and shortcuts of functions with high use frequency are formed.

However, a user does not always use only a specific image reading apparatus. In an environment where a user uses a plurality of image processing apparatuses, the same information must be input to image processing apparatuses to be frequently used.

In this method, however, since the same information must be set in each of image processing apparatuses that require input, the operation is very cumbersome.

An invention to solve this problem is disclosed in, e.g., Japanese Patent Laid-Open No. 2004-312302. According to this invention, in transmitting image data generated by reading a document image to a service on the Internet, service list information is acquired from an IC card, and set windows and set procedures are personalized for the operator. The various personalized settings are transmitted together with the image data.

However, although not mentioned in this prior art, the personalized information remains in other image reading apparatuses and causes a security problem. To solve this problem, conventionally, the user manually deletes information remaining on each image reading apparatus. However, this method depends on the user's manual operation, and the user may forget to delete information in some of a plurality of image reading apparatuses, leaving the security problem unsolved.

SUMMARY OF THE INVENTION

It is an object of the present invention to provide an apparatus for suitably deleting information of, e.g., an operation environment that is personalized in a given apparatus and handled in another apparatus and remains in it, thereby improving operability and security.

According to one aspect of the present invention, the foregoing problem is solved by providing an information processing apparatus comprising a reception unit adapted to receive operation environment information set in another information processing apparatus, a storage unit adapted to store the operation environment information, an authentication unit adapted to authenticate a user who requests access to the stored operation environment information, a setting unit adapted to set an operation environment based on the operation environment information if authentication is successful, and an erase unit adapted to erase the operation environment information from the storage unit on the basis of a condition after setting by the setting unit.

According to one aspect of the present invention, the foregoing problem is solved by providing an information processing apparatus that transmits operation environment information to another information processing apparatus, comprising an authentication unit adapted to authenticate a user, a selection unit adapted to select the other information processing apparatus to be permitted to access the information if authentication is successful, an information setting unit adapted to set details of operation environment information access to which should be permitted for the selected other information processing apparatus, an erase condition setting unit adapted to set a condition to erase the operation environment information and a transmission unit adapted to transmit the operation environment information to the other information processing apparatus selected by the selection unit.

According to one aspect of the present invention, the foregoing problem is solved by providing a method of causing a plurality of information processing apparatuses to share an operation environment, comprising the steps of receiving operation environment information set in another information processing apparatus, storing the operation environment information, authenticating a user who requests access to the stored operation environment information, setting an operation environment based on the operation environment information if authentication is successful and erasing the operation environment information stored in the storing step, on the basis of a condition after setting in the setting step.

According to another aspect of the present invention, the foregoing problem is solved by providing a method of causing a plurality of information processing apparatuses to share operation environment information, comprising the steps of authenticating a user, selecting an information processing apparatus to be permitted to access managed operation environment information if authentication is successful, setting details of operation environment information access to which should be permitted for the selected other information processing apparatus, setting a condition to erase the operation environment information and transmitting the operation environment information to the information processing apparatus selected in the selecting step.

Further features of the present invention will become apparent from the following description of exemplary embodiments (with reference to the attached drawings).

BRIEF DESCRIPTION OF THE DRAWINGS

FIG. 20 is a view showing an example of a "print in progress" window 2001 of the remote image reading apparatus;

FIG. 22 is a view showing an example of a window 2201 that displays an e-mail address table of the remote image reading apparatus;

FIG. 27 is a view schematically showing an example of the structure of user information 402;

FIG. 28 is a view schematically showing an example of the structure of box information 403;

FIG. 29 is a view schematically showing an example of the structure of box document information 404;

FIG. 30 is a view schematically showing an example of the structure of address table information 405;

FIG. 31 is a view schematically showing an example of the structure of device information 406;

FIG. 32 is a view schematically showing an example of the structure of customized information 407;

FIG. 33 is a view schematically showing an example of the structure of security information 408;

FIG. 34 is a view schematically showing an example of the structure of access permission information 409;

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 38:
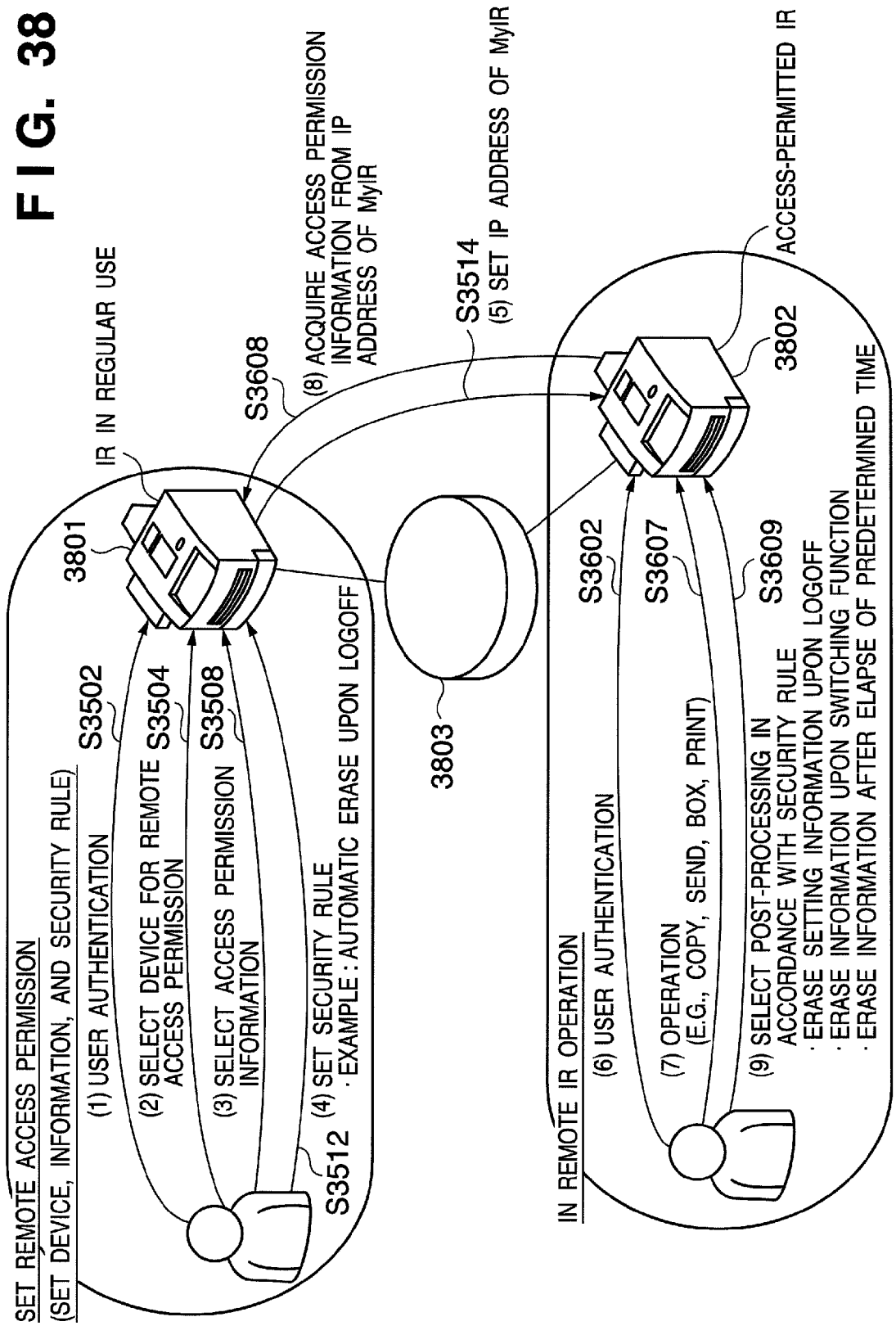
FIG. 38 is a view for explaining the outline of processing in an information processing system comprising the image reading apparatus according to an embodiment of the present invention.

In this embodiment, an information processing system in which a plurality of information processing apparatuses are connected on a network such as the Internet or a LAN, as shown in FIG. 38, will be described. In the following embodiment, an image reading apparatus will be exemplified as an information processing apparatus. Instead, a digital multifunctional peripheral (MFP) may also be used.

Figure 1:
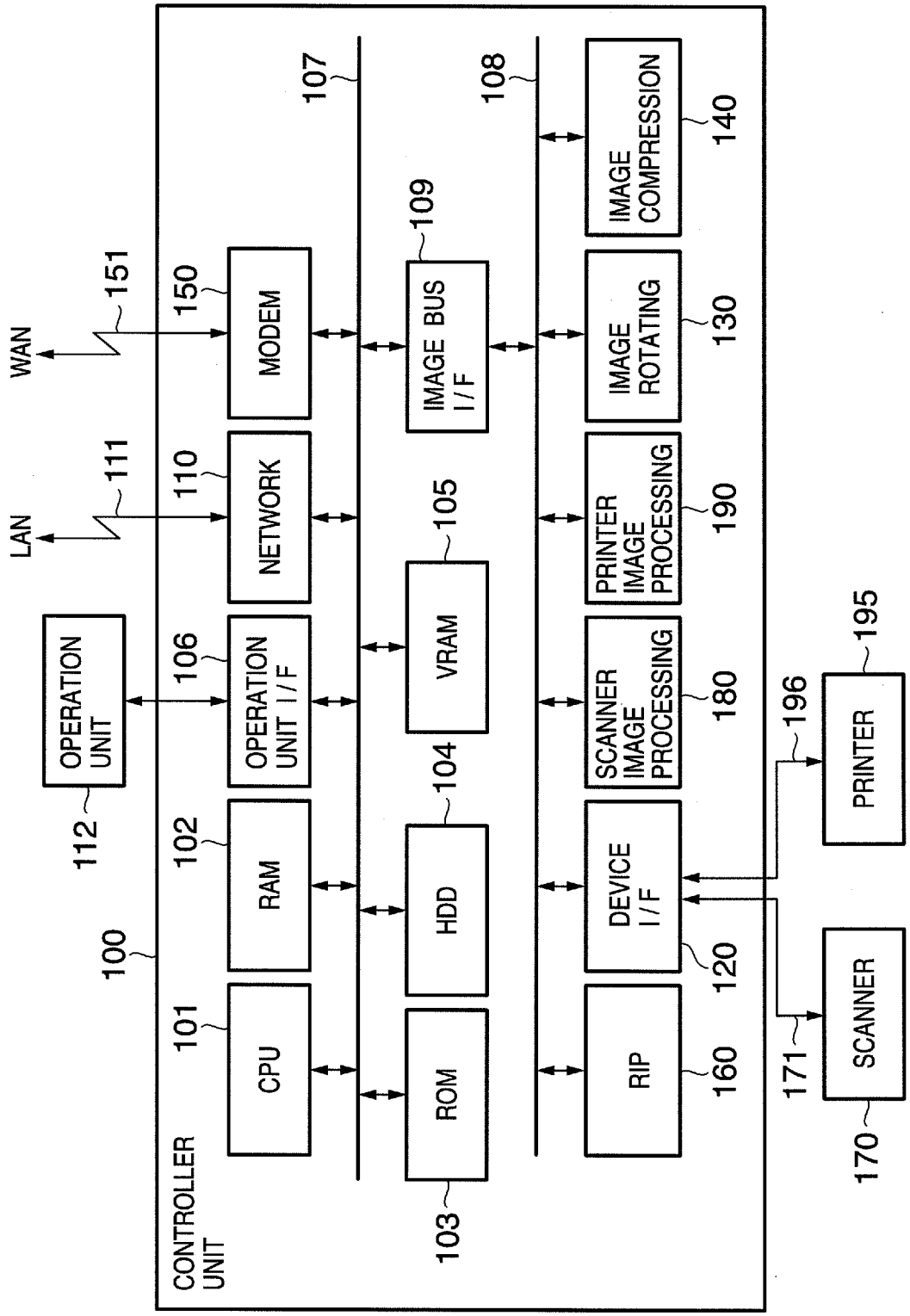
FIG. 1 is a block diagram showing the detailed arrangement of an image reading apparatus in an information processing system according to an embodiment of the present invention.

FIG. 1 is a block diagram showing the detailed arrangement of an image reading apparatus in an information processing system according to an embodiment of the present invention.

The image reading apparatus according to this embodiment comprises a controller unit 100, as shown in FIG. 1. The controller unit 100 inputs/outputs image information and device information by connecting a scanner 170 serving as an image input device and a printer 195 serving as an image output device and also a LAN 111 and a public line (WAN) 151.

The controller unit 100 comprises a CPU 101 to control the overall apparatus, and a RAM 102 that provides the work area of the CPU 101 and temporarily stores image data. The controller unit 100 also comprises a ROM 103 to store a boot program, and an HDD (hard disk device) 104 that stores application programs such as a system program and image data.

In addition to the ROM 103, RAM 102, and HDD 104, a VRAM 105, operation unit I/F 106, image bus 109, network I/F 110, and modem 150 are connected to the CPU 101 through a system bus 107. The VRAM 105 is a memory to store an operation unit display image that is generated by the CPU 101 and displayed on an operation unit 112. The operation unit I/F 106 serving as an interface to the operation unit (UI) 112 outputs, to the operation unit 112, image data that is stored in the VRAM 105 and should be displayed on the operation unit 112. The operation unit 112 transfers information input by the user to the CPU 101. The network I/F 110 is connected to the LAN 111 to input/output information through the LAN 111. The modem 150 is connected to the public line 151 to input/output information through the public line 151.

The image bus 109 is a bus bridge that converts a data structure by connecting the system bus 107 to an image bus 108 to transfer image data at a high speed. The image bus 108 is formed from a PCI bus or IEEE1394. A raster image processor (RIP) 160, device I/F 120, scanner image processing unit 180, printer image processing unit 190, image rotating unit 130, and image compression unit 140 are connected to the image bus 108.

The raster image processor 160 rasterizes a PDL code to a bitmap image. The device I/F 120 is an interface to connect the scanner 170 and printer 195 serving as image input/output devices to the controller unit 100 and converts the synchronous/asynchronous system of image data. The device I/F 120 and scanner 170 are connected through a scanner interface 171. The device I/F 120 and printer 195 are connected through a printer interface 196. The scanner image processing unit 180 corrects, manipulates, and edits input image data. The printer image processing unit 190 executes printer correction and resolution conversion for print output image data. The image rotating unit 130 rotates image data. The image compression unit 140 compresses multivalued image data by JPEG and binary image data by JBIG, MMR, or MH and decompresses image data.

Figure 2:
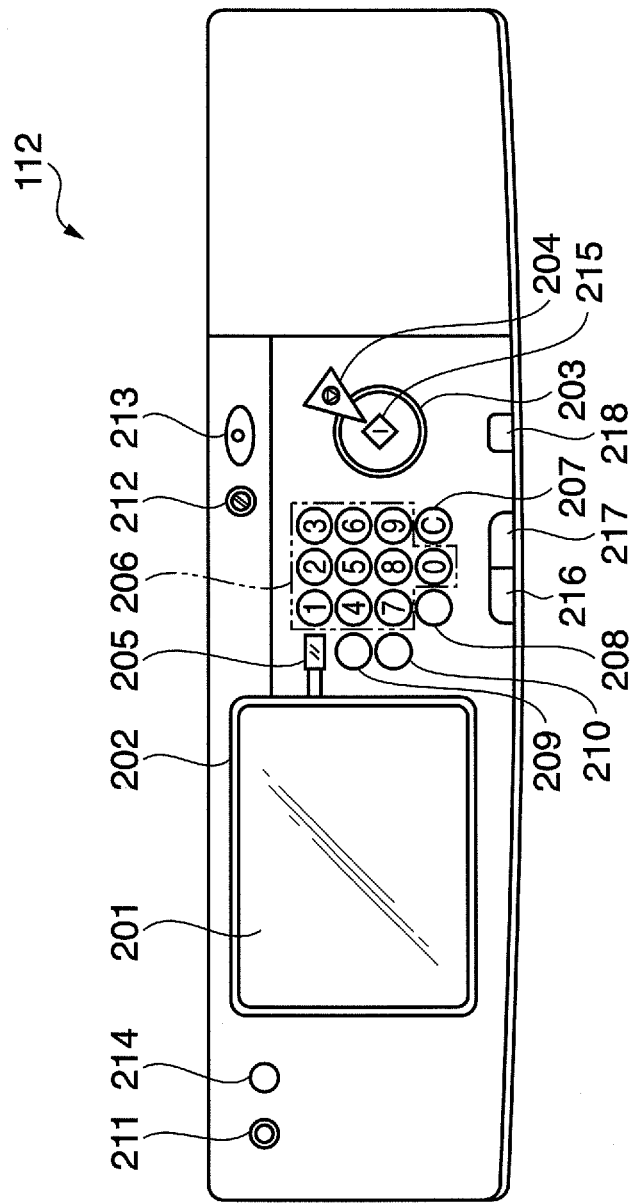
FIG. 2 is a view showing the outer arrangement of an operation unit 112 of the image reading apparatus shown in FIG. 1.
Figure 3:
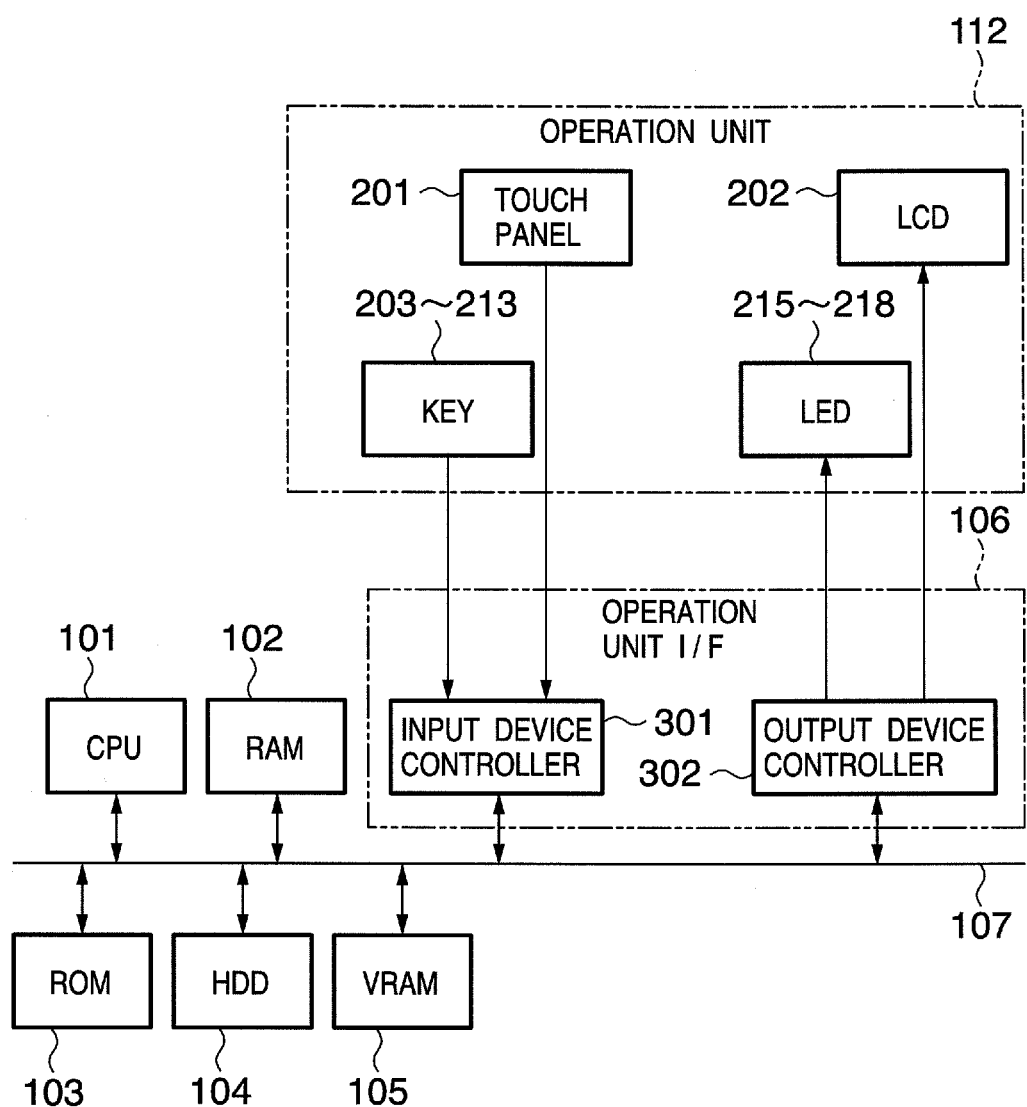
FIG. 3 is a block diagram showing the detailed arrangement of the operation unit 112 and an operation unit I/F 106 of the image reading apparatus shown in FIG. 1.

The arrangement of the operation unit 112 will be described next with reference to FIGS. 2 and 3. FIG. 2 is a view showing the outer arrangement of the operation unit 112. FIG. 3 is a block diagram showing the detailed arrangement of the operation unit 112 and operation unit I/F 106.

As shown in FIG. 2, the operation unit 112 has an LCD display unit 202 with a touch panel 201 bonded on it. The LCD display unit 202 displays the system operation window and software keys. When the portion of a displayed key is pressed, the LCD display unit 202 transmits the position information to the CPU 101. The operation unit 112 has various kinds of hardware keys. The hardware keys include a start key 203, stop key 204, reset key 205, ten-key pad 206, clear key 207, ID key 208, guide key 209, user mode key 210, counter key 211, power saving key 212, and power key 213.

The start key 203 is used to, e.g., start a document image reading operation. The start key 203 has a 2-color LED 215 of red and green at its central portion to indicate by the color whether the start key 203 is valid/invalid. The stop key 204 acts to stop an operation in progress. The reset key 205 is used to initialize the settings of the operation unit 112. The ten-key pad 206 is used to input a numerical value and includes number keys of 0 to 9. The clear key 207 is used to clear an input numerical value. The ID key 208 is used by the user to input a user ID.

The guide key 209 is used to display help for setting and input method. The user mode key 210 is used to do special setting or detailed setting of the operation of the apparatus. The counter key 211 is used to confirm the number of paper sheets printed by the apparatus. The power saving key 212 is used to make the apparatus stand by and reduce power consumption. The power key 213 turns on/off the apparatus.

The operation unit 112 also has tally lamps 216 and 217 that blink or light up when the apparatus is operating or has an error. A power lamp 218 is provided on the operation unit 112. The power lamp 218 lights up when the apparatus is powered on by the power key 213.

As shown in FIG. 3, the operation unit I/F 106 has an input device controller 301 and an output device controller 302. The input device controller 301 receives a user input from the touch panel 201 and a key group 220 (hardware keys 203 to 213) of the operation unit 112 and transfer, to the CPU 101, the received user input as operation contents. The CPU 101 generates display window data on the basis of the input operation contents and a control program (to be described later with reference to the flowchart in FIG. 8) stored in the HDD 104. The generated window data is temporarily stored in the VRAM 105 and output to the LCD 202 through the output device controller 302 of the operation unit I/F 106.

The CPU 101 supplies a control signal to the output device controller 302 in accordance with the control program on the basis of a user input or device state. The output device controller 302 turns on/off the LEDs 215 to 218 included in the LED group 203.

Figure 4:
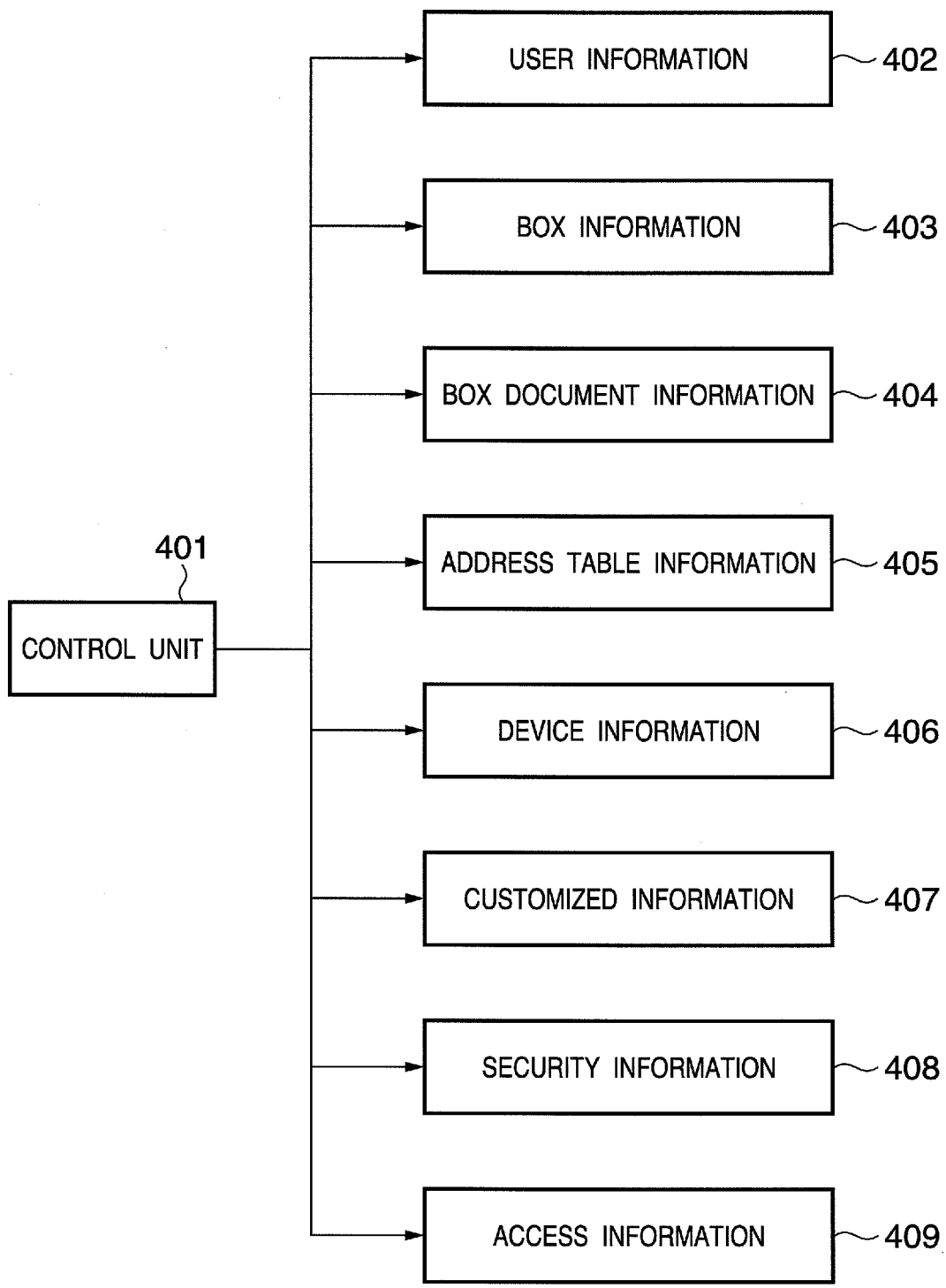
FIG. 4 is a block diagram showing the functional arrangement to process set data which is stored in an HDD 104 in the image reading apparatus shown in FIG. 1 and related to access permission executed by a CPU 101.

FIG. 4 is a block diagram showing the functional arrangement to process set data which is stored in the HDD 104 in the image reading apparatus shown in FIG. 1 and related to access permission executed by the CPU 101. FIG. 4 shows the essential functions of the image reading apparatus shown in FIG. 1, with which a plurality of image reading apparatuses operate in cooperation with each other.

Figure 35:
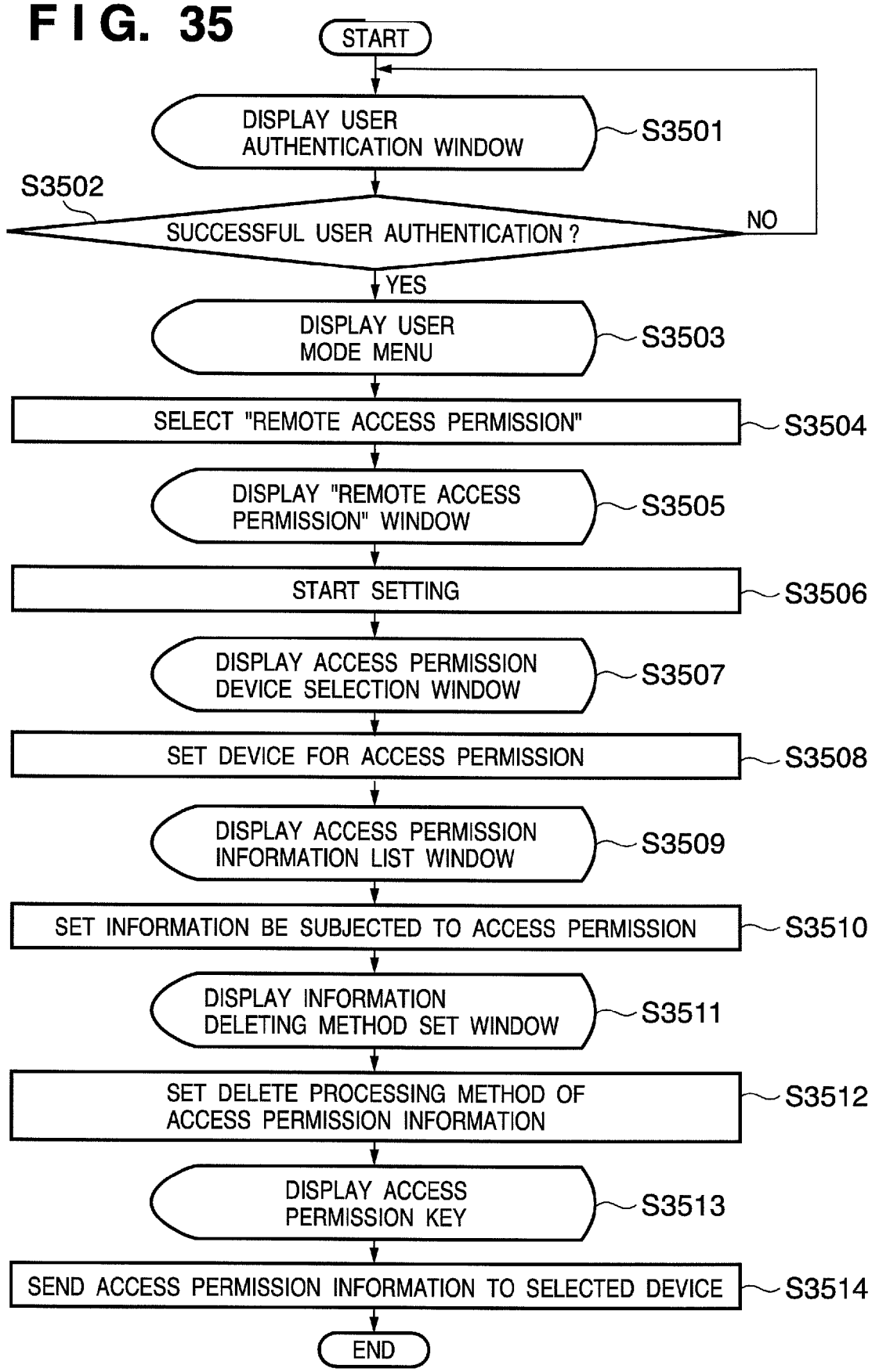
FIG. 35 is a flowchart for explaining an operation of causing the "original" image reading apparatus to set access information permission from the "remote" image reading apparatus.
Figure 36:
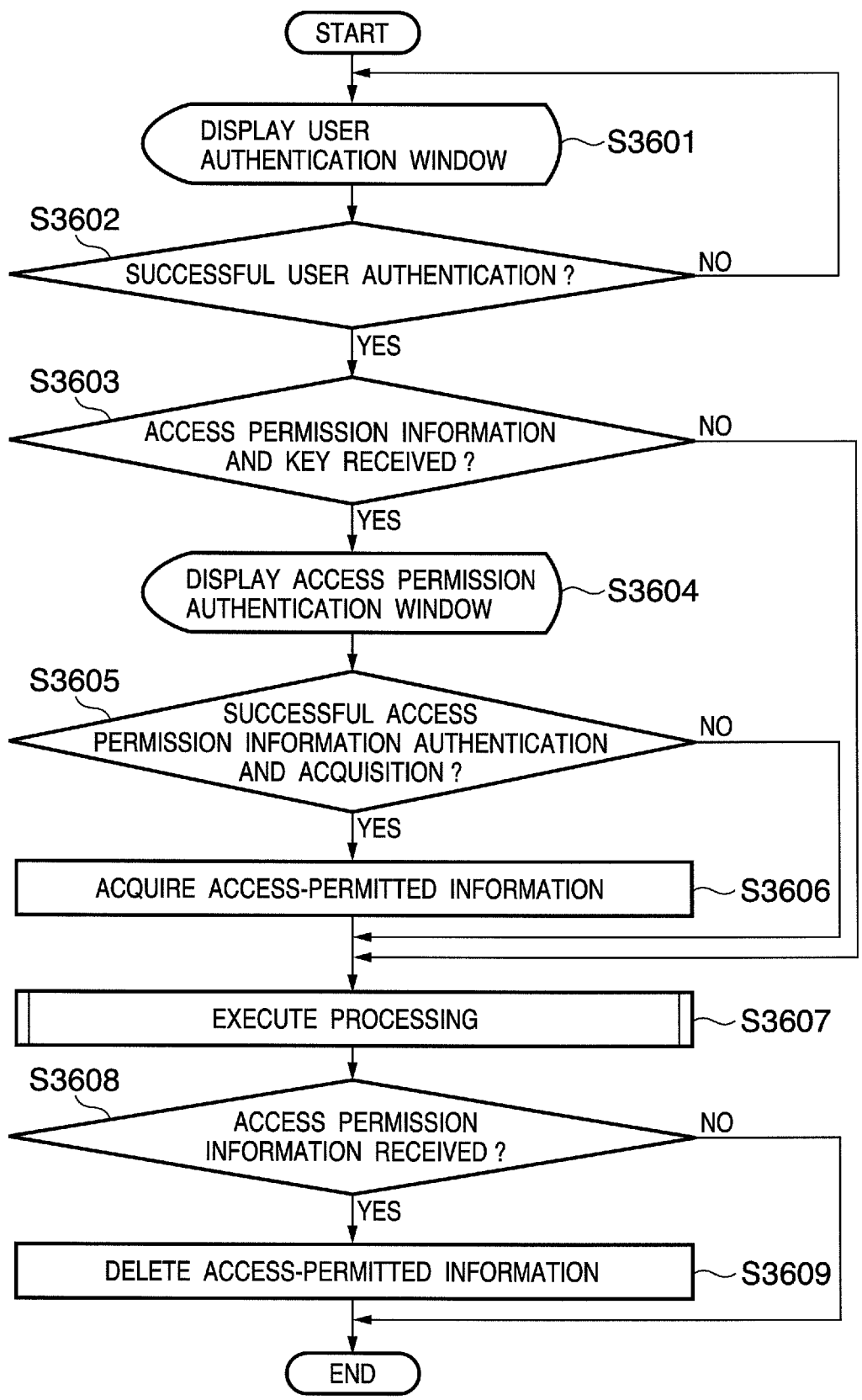
FIG. 36 is a flowchart for explaining processing procedures using access-permitted information in a "remote" image reading apparatus 3802.
Figure 37:
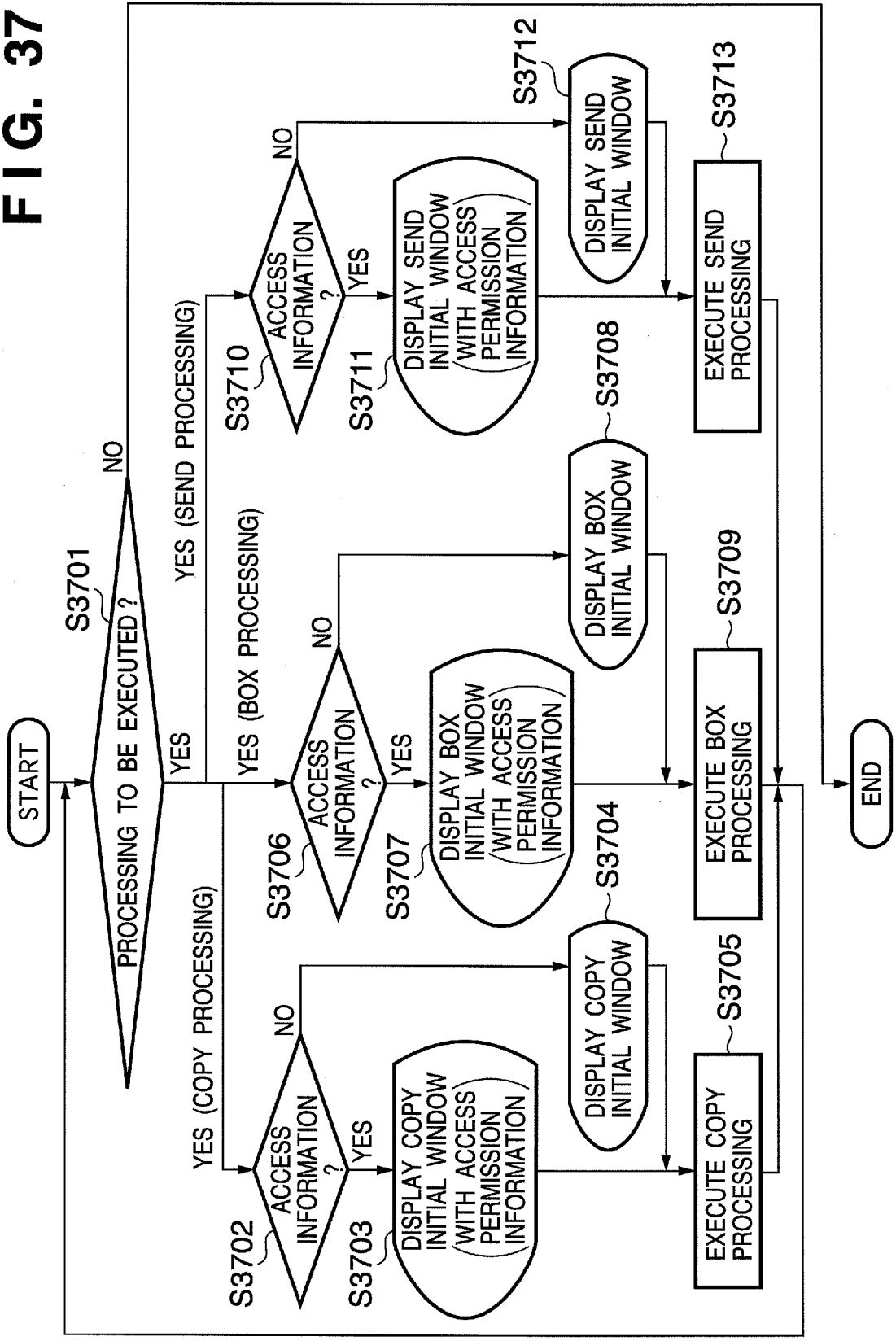
FIG. 37 is a flowchart for explaining details of processing in step S3607 of the flowchart in FIG. 36.

This functional arrangement is obtained by causing the CPU 101 to execute the control program stored in the HDD 104. With this functional arrangement, processing corresponding to procedures shown in FIGS. 35, 36, and 37 is executed.

A control unit 401 controls the overall apparatus on the basis of the program stored in the HDD 104 and executes various kinds of processing on the basis of contents set from the operation unit 112.

User information 402 stores information to specify the user of the image reading apparatus. Box information 403 stores information about document storage one-layer folders (to be referred to as "boxes" hereinafter) stored in the image reading apparatus. Box document information 404 stores information about documents stored in each box of the box information 403. Address table information 405 stores information about e-mail addresses. Device information 406 stores information about devices connected by the LAN 111.

Customized information 407 stores information with access permission from a specific image reading apparatus to another image reading apparatus and information about the state. If information with access permission from a specific image reading apparatus to another image reading apparatus is present, security information 408 stores information about a method of deleting the information. Access information 409 stores information about keys for access permission from a specific image reading apparatus to another image reading apparatus.

A series of processing operations according to this embodiment will be described next with reference to window examples in FIGS. 5 to 26 which are displayed on the LCD 202. The processing is roughly divided into two flows.

The first processing uses the windows shown in FIGS. 5 to 11. FIGS. 5 to 11 show windows (to be referred to as an access permission set window group in an "original" image reading apparatus hereinafter) to execute setting for permitting a remote device to access information. The windows shown in FIGS. 5 to 11 are merely examples.

The second processing uses the windows shown in FIGS. 12 to 26. FIGS. 12 to 26 show windows (to be referred to as a use window group in a "remote" image reading apparatus hereinafter) to be used when an information access permission is acquired from the remote image reading apparatus. The windows shown in FIGS. 12 to 26 are examples.

Each window of the access permission set window group in the "original" image reading apparatus will be described first with reference to FIGS. 5 to 11. As a supplementary explanation for parts irrelevant to the spirit of the present invention, a description of software keys, buttons, list boxes, and messages in some windows will be omitted.

Figure 5:
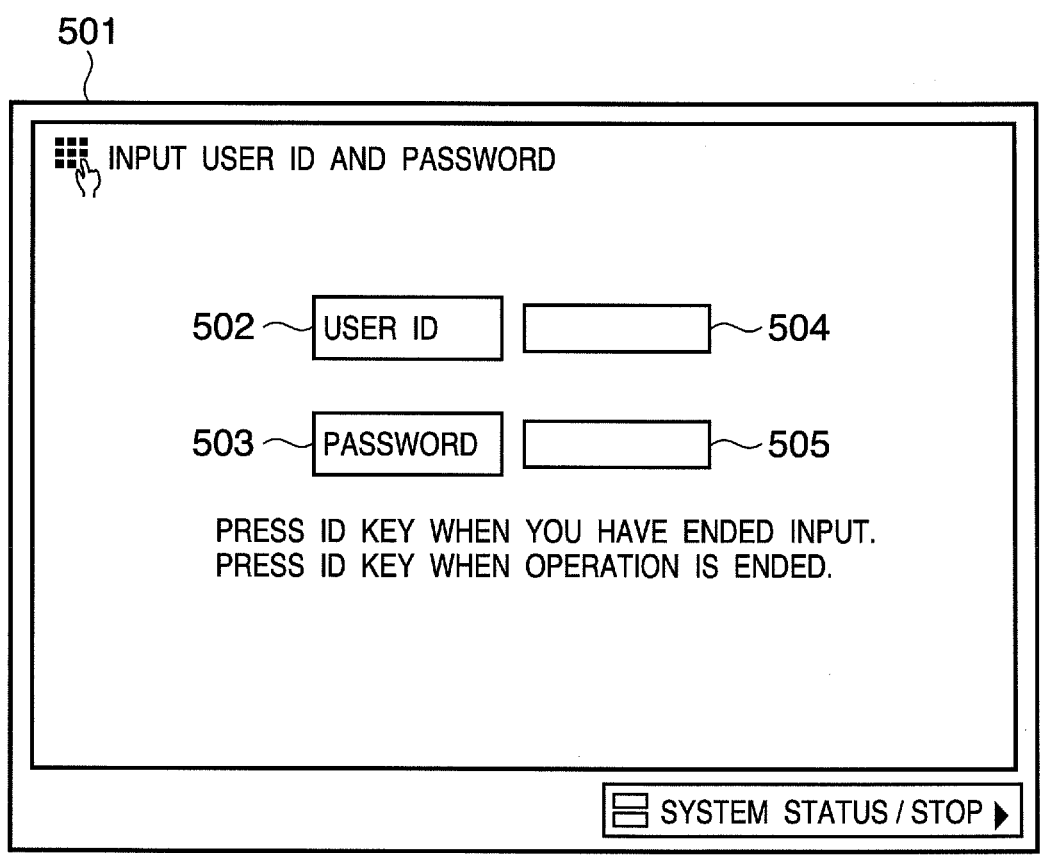
FIG. 5 is a view showing a user authentication window 501 as an example of a window for user authentication of an original image reading apparatus.

FIG. 5 is a view showing a user authentication window 501 as an example of a window for user authentication of an original image reading apparatus. The window shown in FIG. 5 has a user ID key 502 and a password key 503 as software keys. The window also has a user ID input field 504 and a password input field 505 as input fields. The user inputs the user ID and password to the fields and presses the ID key 208. Then, user authentication is executed.

Figure 6:
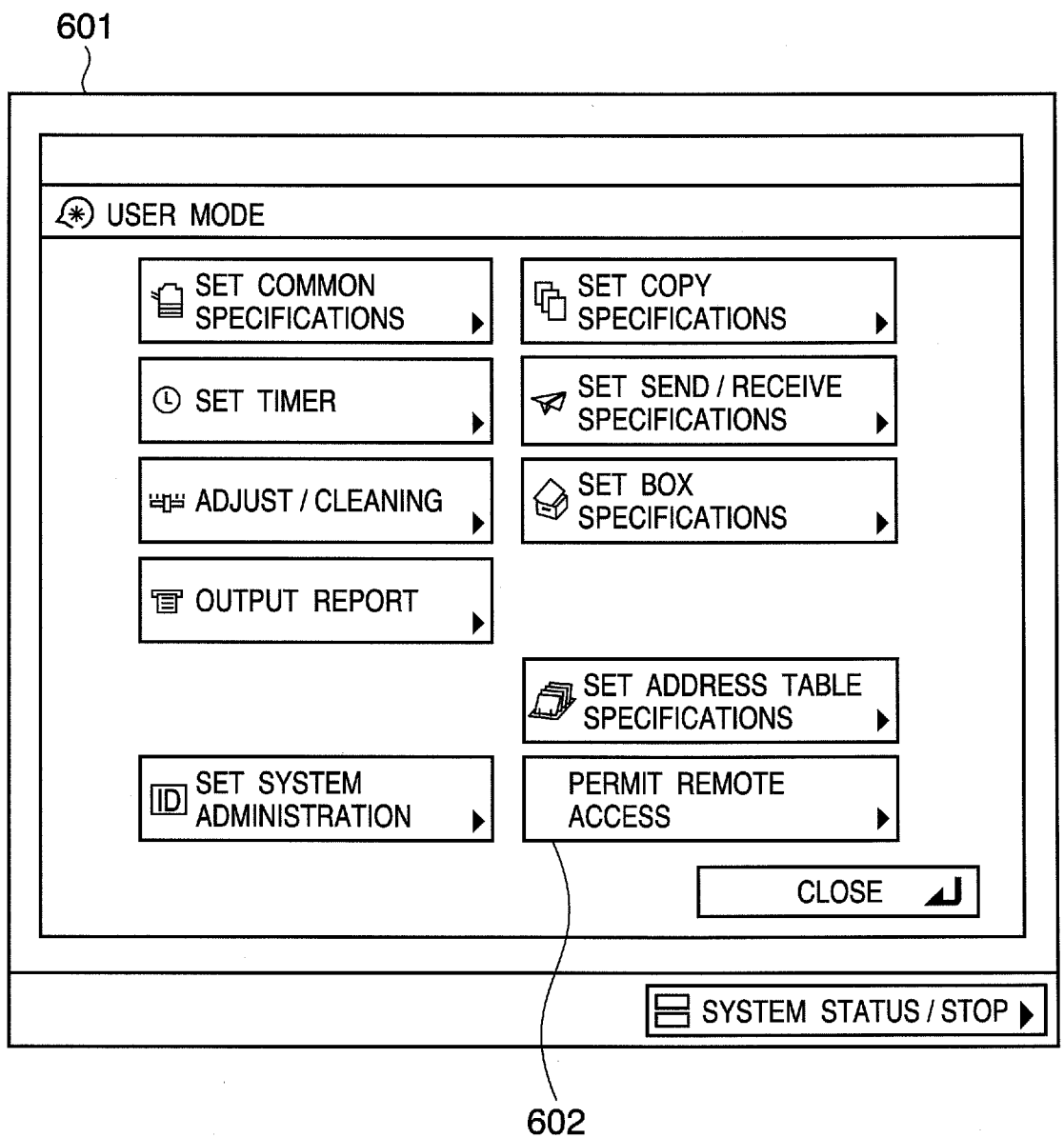
FIG. 6 is a view showing a management menu 601 as an example of a menu window of remote access permission of the original image reading apparatus.

FIG. 6 is a view showing a management menu 601 as an example of a menu window of remote access permission of the original image reading apparatus. Only a remote access permission key 602 as a software key related to the present invention will be explained here, and a description of irrelevant software keys will be omitted. When the user presses the remote access permission key 602, display changes to the window shown in FIG. 7.

Figure 7:
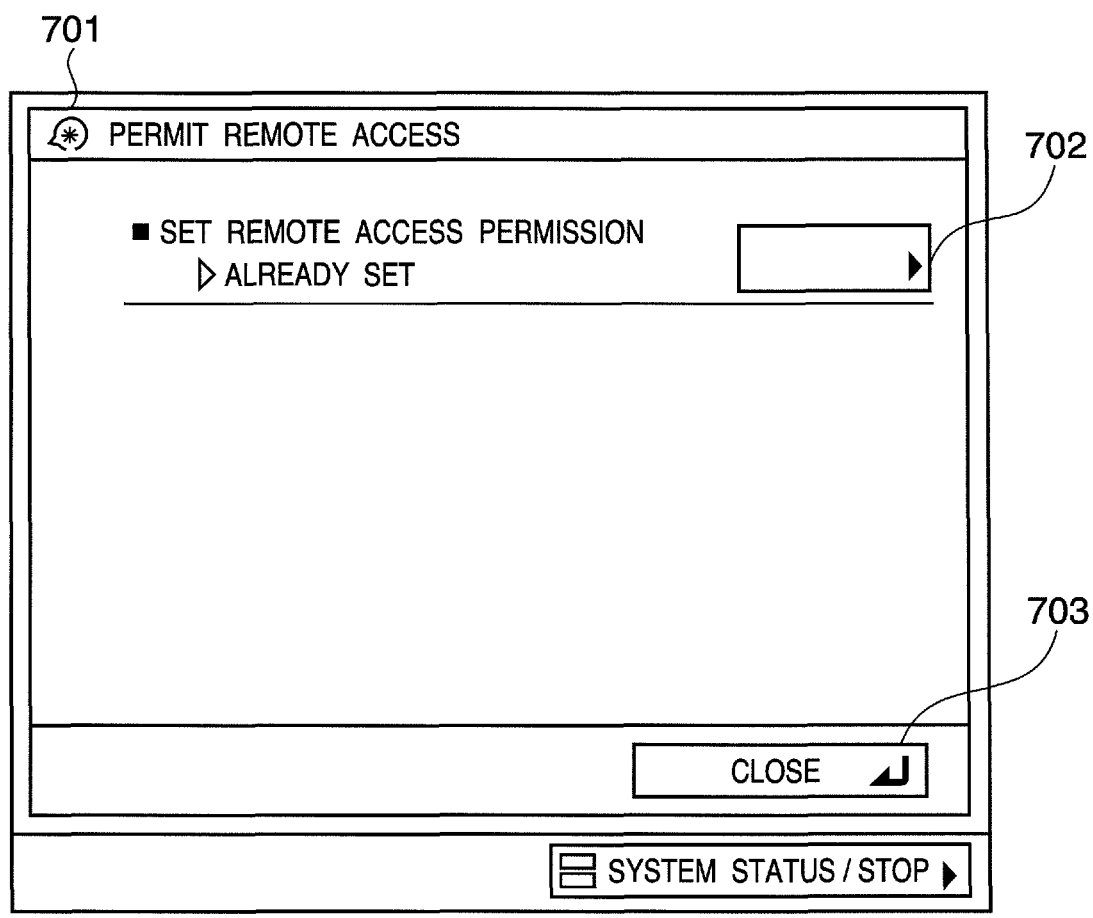
FIG. 7 is a view showing a remote access permission menu window 701 as an example of a remote access permission setting start window of the original image reading apparatus.

FIG. 7 is a view showing a remote access permission menu window 701 as an example of a remote access permission setting start window of the original image reading apparatus. The remote access permission menu window 701 shown in FIG. 7 is an example of a window before change to the menus shown in FIGS. 8, 9, and 10. Software keys include a remote access permission set key 702 and a "close" key 703. When the user presses the remote access permission set key 702, display changes to the window shown in FIG. 8. On the other hand, when the user presses the "close" key 703, display returns to the window shown in FIG. 6.

Figure 8:
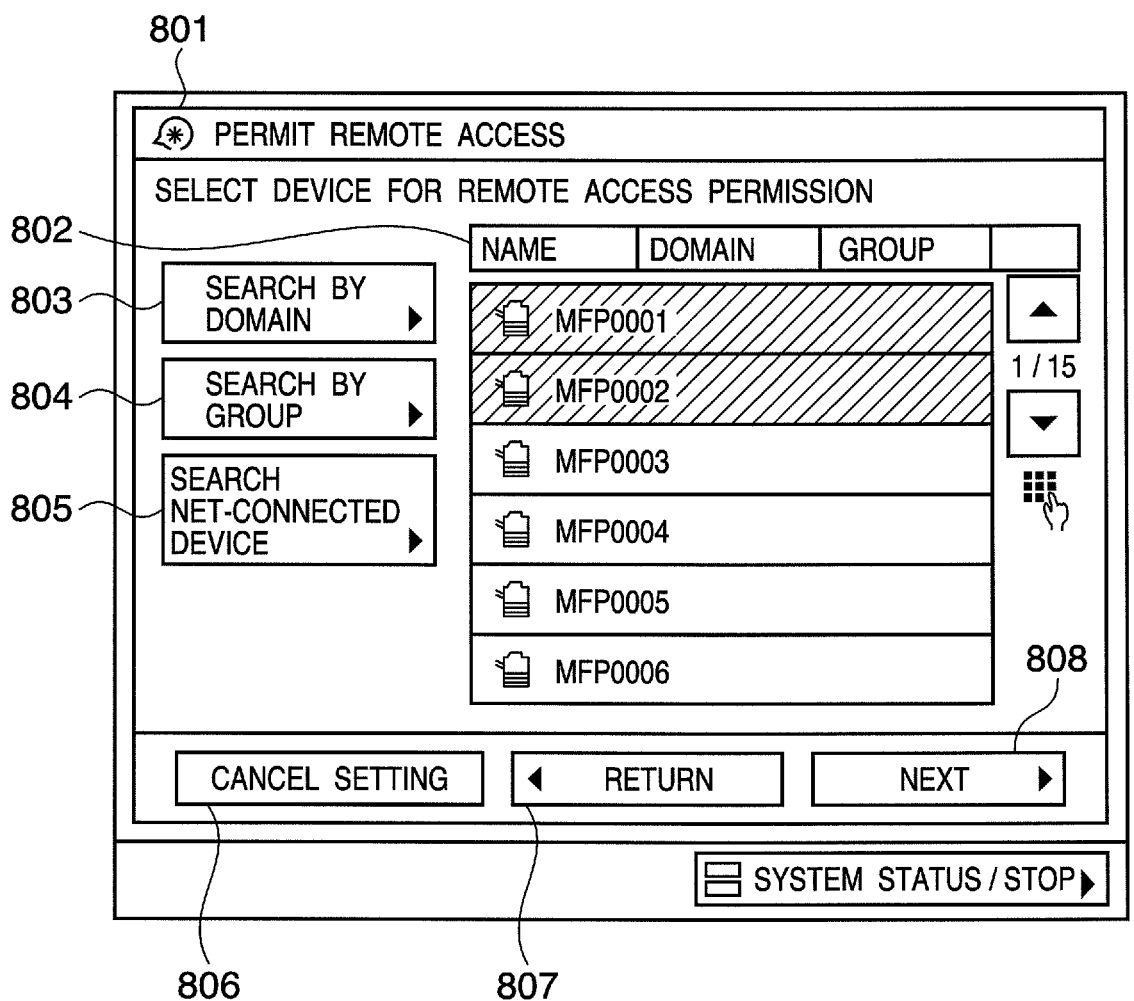
FIG. 8 is a view showing an example of a device selection list window 801 of the original image reading apparatus.

FIG. 8 is a view showing an example of a device selection list window 801 of the original image reading apparatus. The device selection list window 801 shown in FIG. 8 is an example of a window to make the user select a device to permit access. This window has a device selection list 802 as a list and a domain search key 803, group search key 804, network-connected device search key 805, "cancel setting" key 806, "return" key 807, and "next" key 808 as software keys. The domain search key 803 extracts and displays only devices set in a domain in the list. The group search key 804 extracts and displays only devices set in a group in the list. The network-connected device search key 805 extracts and displays devices connected to the Internet. The "cancel setting" key 806 cancels settings on this window and changes display to the precedingly displayed window. The "return" key 807 changes display to the previous window. The "next" key 808 changes display to the window shown in FIG. 9. In the device selection list 802, one or a plurality of devices can be selected.

Figure 9:
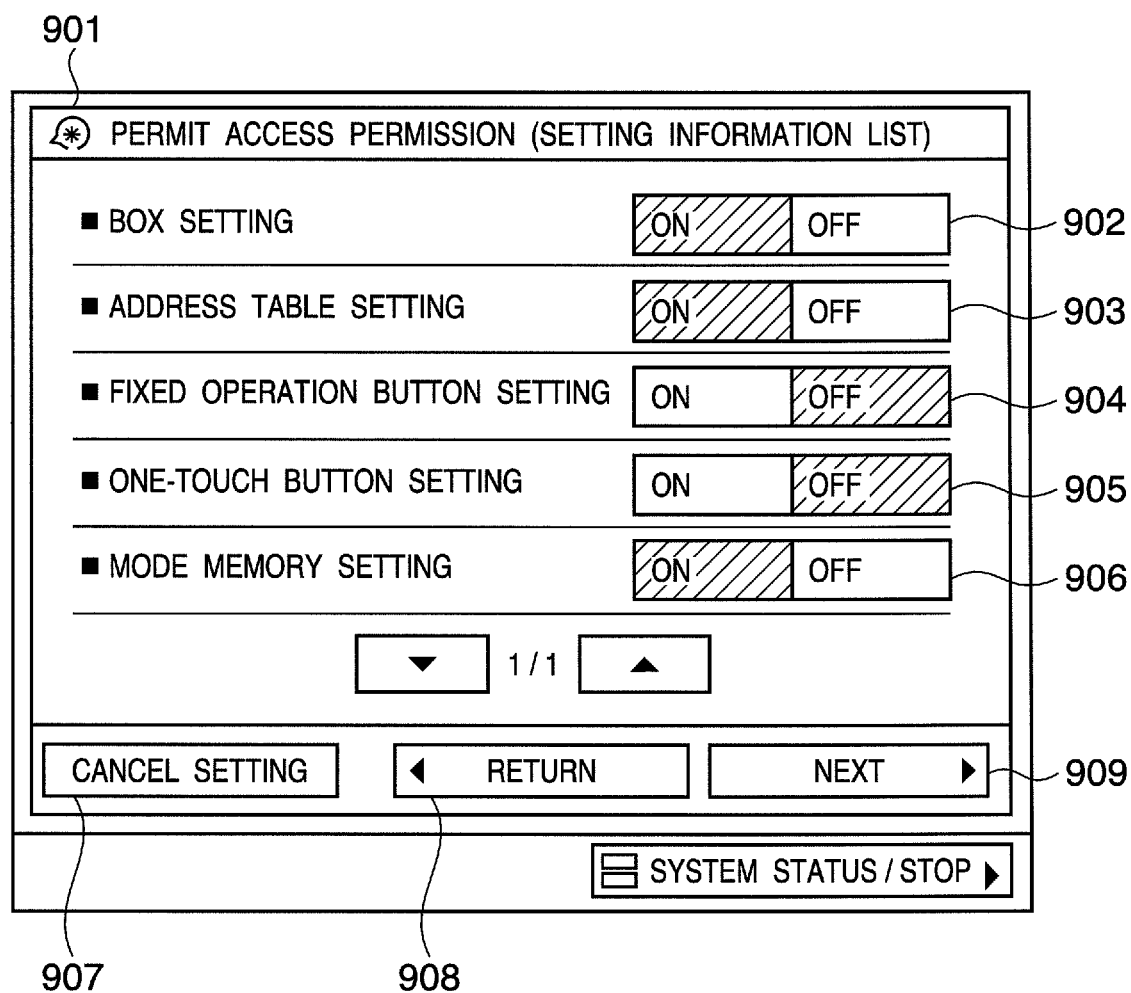
FIG. 9 is a view showing an example of a customized information setting list window 901 of the original image reading apparatus.

FIG. 9 is a view showing an example of a customized information setting list window 901 of the original image reading apparatus. The customized information setting list window 901 shown in FIG. 9 is an example of a window to set information for access permission from a remote image reading apparatus. This window has, as software keys, a box set key 902, address table set key 903, fixed operation button set key 904, one-touch button set key 905, mode memory set key 906, "cancel setting" key 907, "return" key 908, and "next" key 909.

Access permission of each item of the keys 902 to 906 can be set to ON or OFF. The "cancel setting" key 907 cancels settings on this window and changes display to the precedingly displayed window. The "return" key 908 changes display to the previous window. The "next" key 909 changes display to the window shown in FIG. 10. Even an item that is not displayed on this window can also be displayed on this window and selected if the item is customizable by the user and enables access permission from a remote site.

Figure 10:
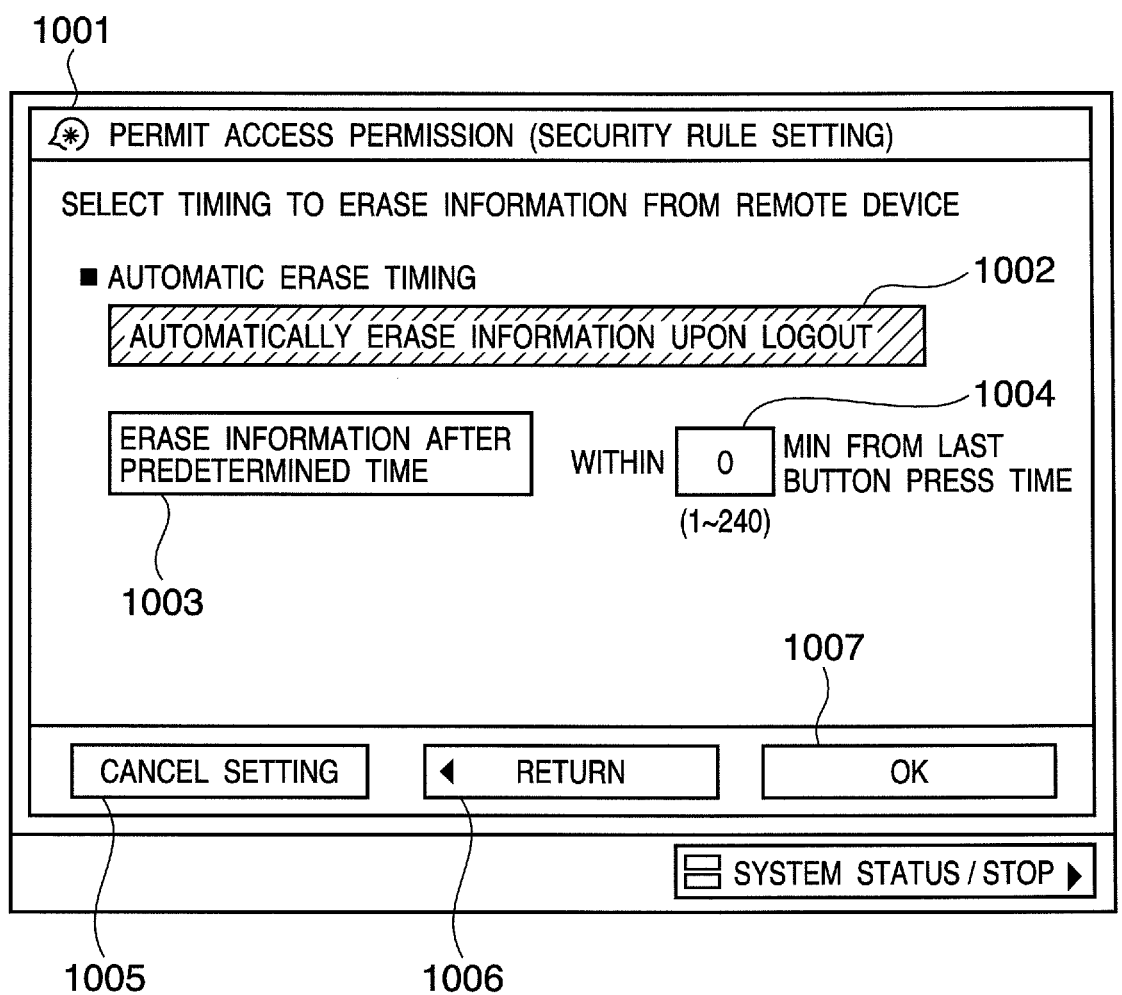
FIG. 10 is a view showing an example of a security rule set window 1001 of the original image reading apparatus.

FIG. 10 is a view showing an example of a security rule set window 1001 of the original image reading apparatus. The security rule set window 1001 shown in FIG. 10 is an example of a window to set how to handle information in FIG. 9 (to be referred to as a "security rule" hereinafter) on the device set in FIG. 8 in the remote image reading apparatus.

Figure 11:
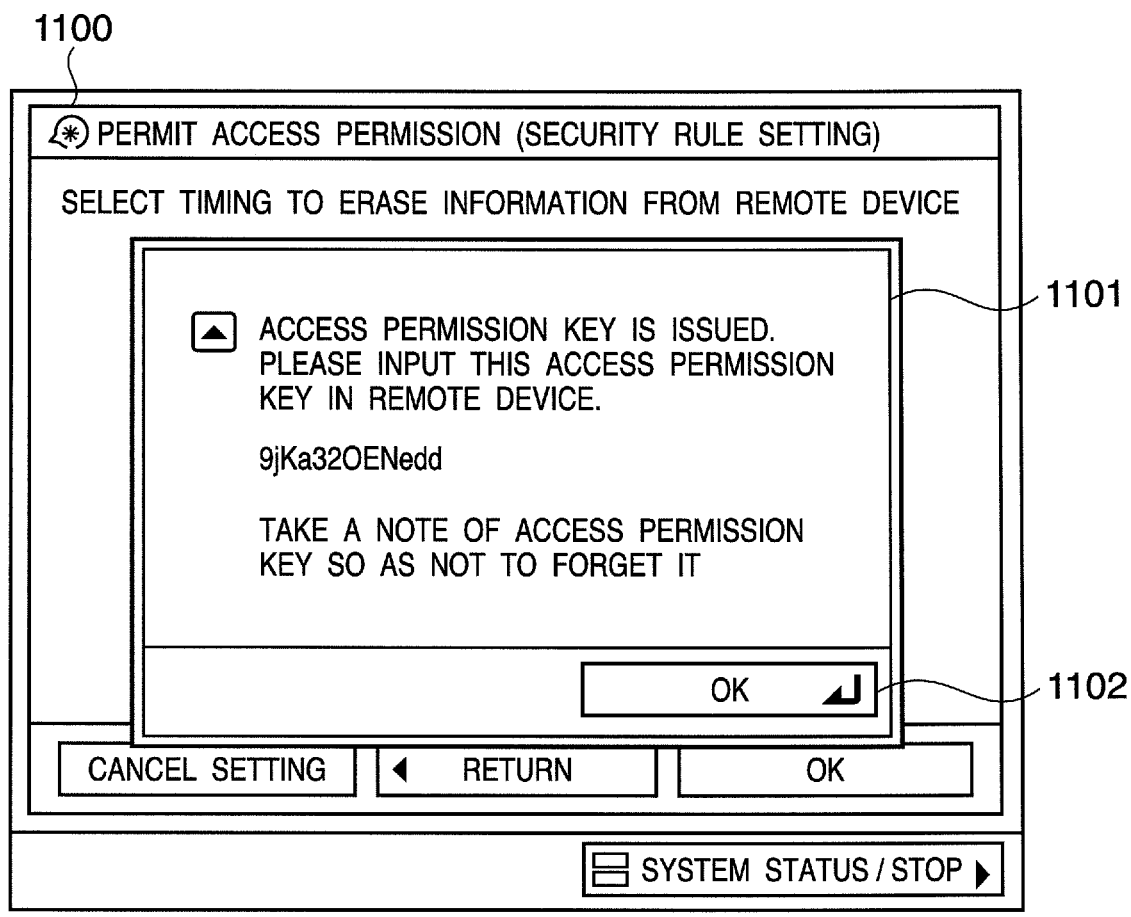
FIG. 11 is a view showing an example of an access permission key issue window 1101 of the original image reading apparatus.

Software keys include an "erase upon logout" key 1002, "erase after predetermined time" key 1003, "cancel setting" key 1005, "return" key 1006, an "OK" key 1007. The window also has a time input field 1004 as an input field. In this window, whether to automatically erase information upon logout can be selected by pressing the "erase upon logout" key 1002. Alternatively, whether to automatically erase information after a predetermined time can be selected by pressing the "erase after predetermined time" key 1003 and inputting a time to the input field. When the "cancel setting" key 1005 is pressed, settings on this window are canceled, and display returns to the precedingly displayed window. When the "return" key 1006 is pressed, display returns to the previous window. When the "determine" key is pressed, items set on the windows shown in FIGS. 8, 9, and 10 are determined and saved in the original image reading apparatus. In addition, the window shown in FIG. 11 is displayed.

In this embodiment, the erase timing upon logout and the erase timing after the elapse of predetermined time have been described as examples. However, any other timing such as automatic erase after the elapse of a predetermined number of days can also be set if the timing allows automatic erase.

An example of a window to issue an access permission key in FIG. 11 will be described next. FIG. 11 is a view showing an example of an access permission key issue window 1101 of the original image reading apparatus. The access key display window 1101 is a dialogue that displays a key to permit access from a "remote" image reading apparatus. When an OK key 1102 as a software key is pressed, the window closes, and display changes to the window shown in FIG. 6. The access key displayed on this window is transmitted to the device permitted to access.

The access permission set window group in the original image reading apparatus has been described above.

Each window of the use window group in the "remote" image reading apparatus will be described next with reference to FIGS. 12 to 26. The supplementary explanation is the same as that for the use window group in the "original" image reading apparatus.

Figure 12:
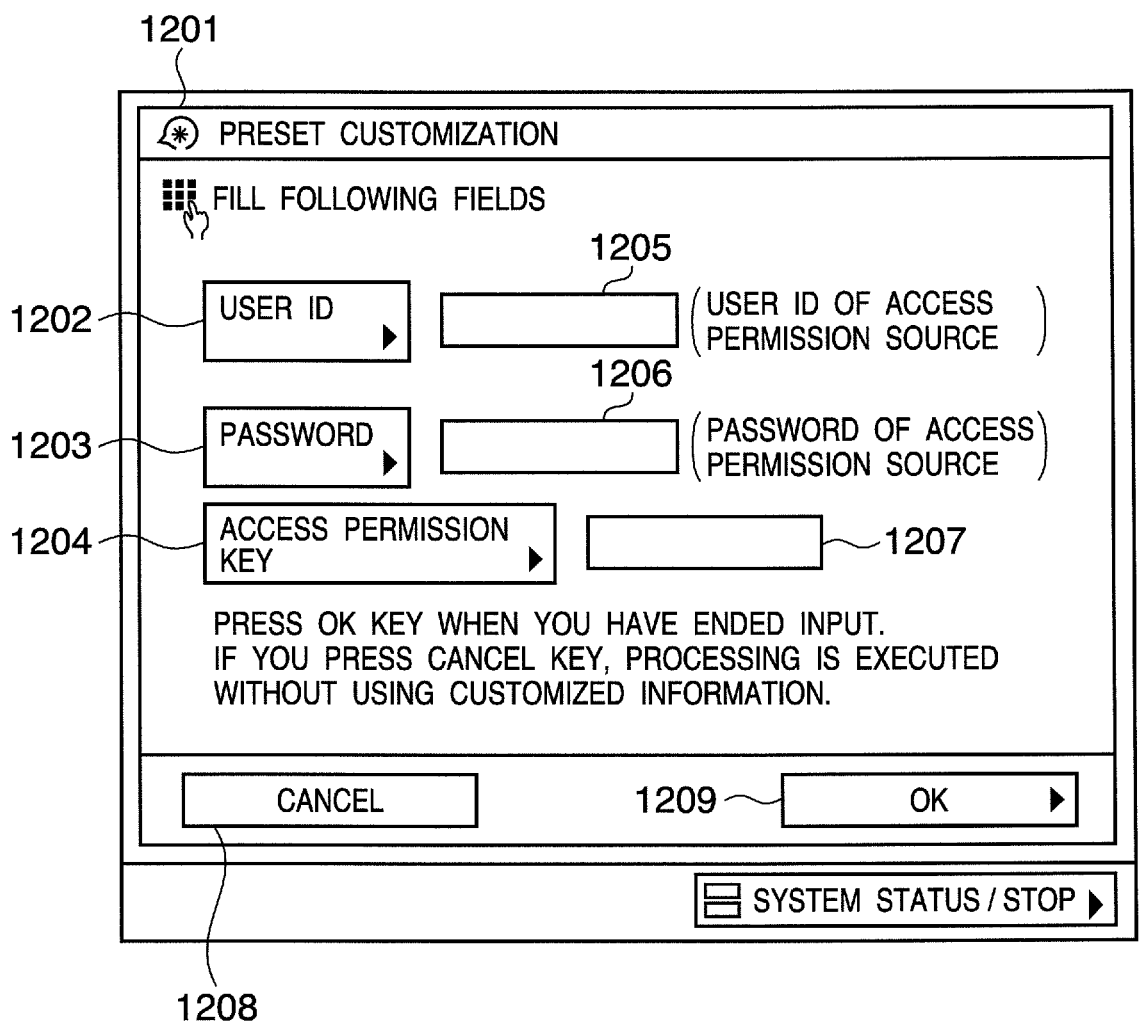
FIG. 12 is a view showing an example of an access permission authentication window 1201 of a remote image reading apparatus.

Before displaying the window shown in FIG. 12, the user authentication window 501 is displayed even in the "remote" image reading apparatus to execute user authentication. FIG. 12 is a view showing an example of an access permission authentication window 1201 of the remote image reading apparatus. FIG. 12 shows an example of a window to execute authentication to acquire information with access permission from the "original" image reading apparatus. The window has a user ID key 1202, password 1203, access permission key 1204, cancel key 1208, and OK key 1209 as software keys. The window has a user ID input field 1205, password input field 1206, and access permission input field 1207 as input fields.

As the authentication method, the user ID input field 1205 receives input of the user ID obtained in FIG. 5. The password input field 1206 receives input of the password obtained in FIG. 5. The access permission input field 1207 receives input of the access permission key shown on the window 1101.

When the OK key 1209 is pressed, user authentication of the original image reading apparatus and authentication of the access permission key are executed. When the cancel key 1208 is pressed, display changes to one of the windows shown in FIGS. 23 to 25 which is set as an initial display window without adding access-permitted information.

Figure 13:
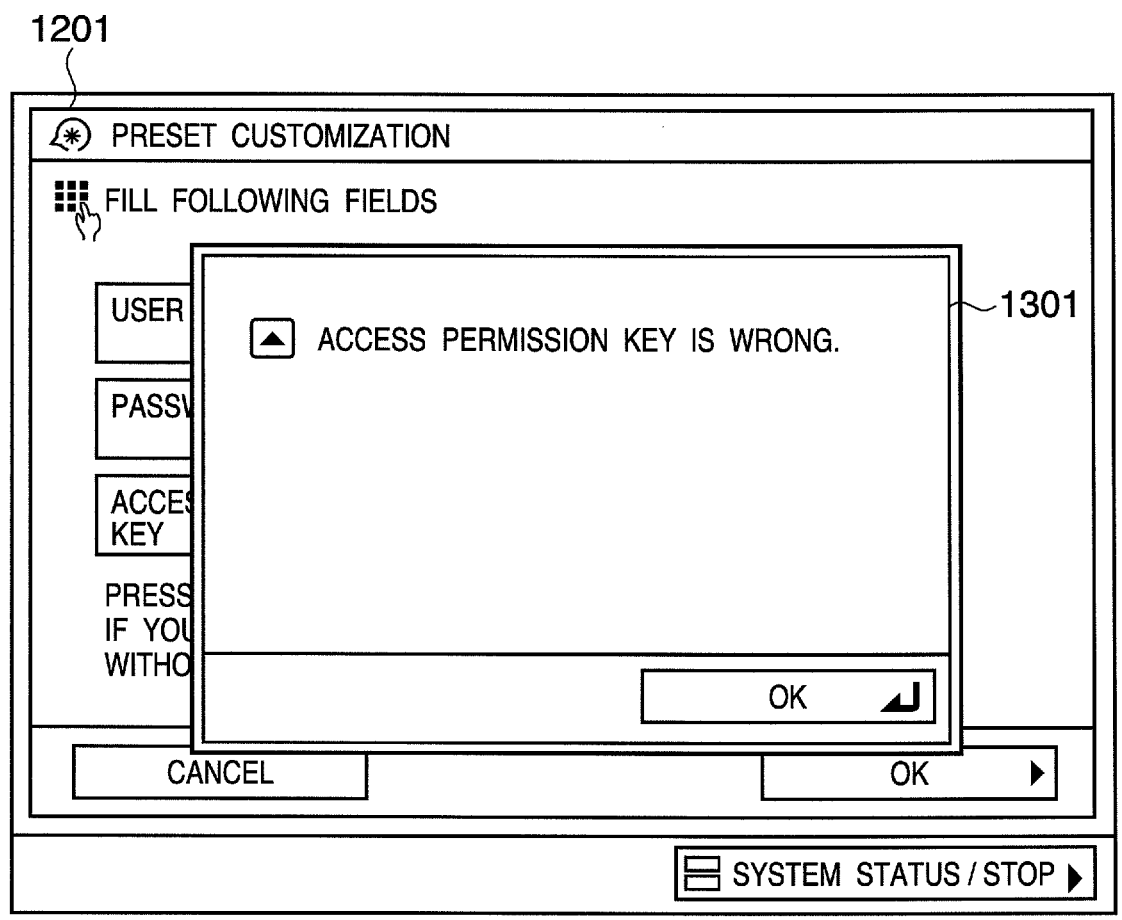
FIG. 13 is a view showing a dialogue 1301 displayed when access permission authentication has failed on the window shown in FIG. 12.

FIG. 13 is a view showing a dialogue 1301 displayed when access permission authentication has failed on the window shown in FIG. 12. When an OK key 1302 as a software key is pressed, display changes to the access permission key input window 1201. Access permission is impossible not only in case of mismatch of the access permission key but also, e.g., when the "original" image reading apparatus stops access permission. In this case, a dialogue like the dialogue 1301 is displayed to present a message indicating that access permission is impossible.

Figure 14:
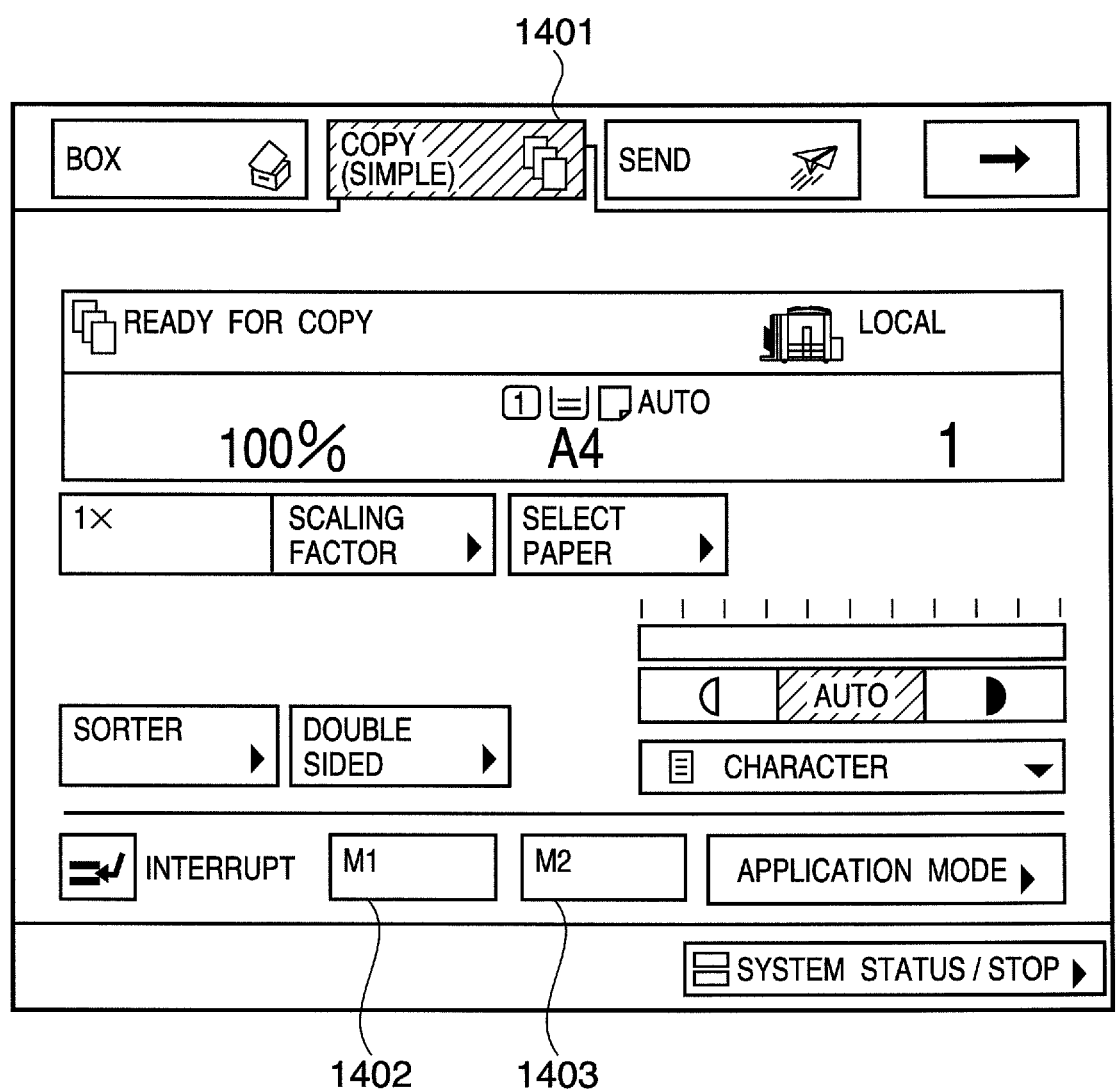
FIG. 14 is a view showing an example of a copy initial window 1401 of the remote image reading apparatus.

FIG. 14 is a view showing an example of a copy initial window 1401 of the remote image reading apparatus. FIG. 14 shows an example of a copy initial window displayed when the original image reading apparatus permits access. As software keys, preset keys 1402 and 1403 are displayed. When the user registers print setting conditions in advance in a preset key displayed on the copy window, he/she can easily utilize the complex print conditions any number of times. In this embodiment, setting is done such that a copy window 1501 shown in FIG. 15 is displayed by pressing the preset key 1402.

Figure 15:
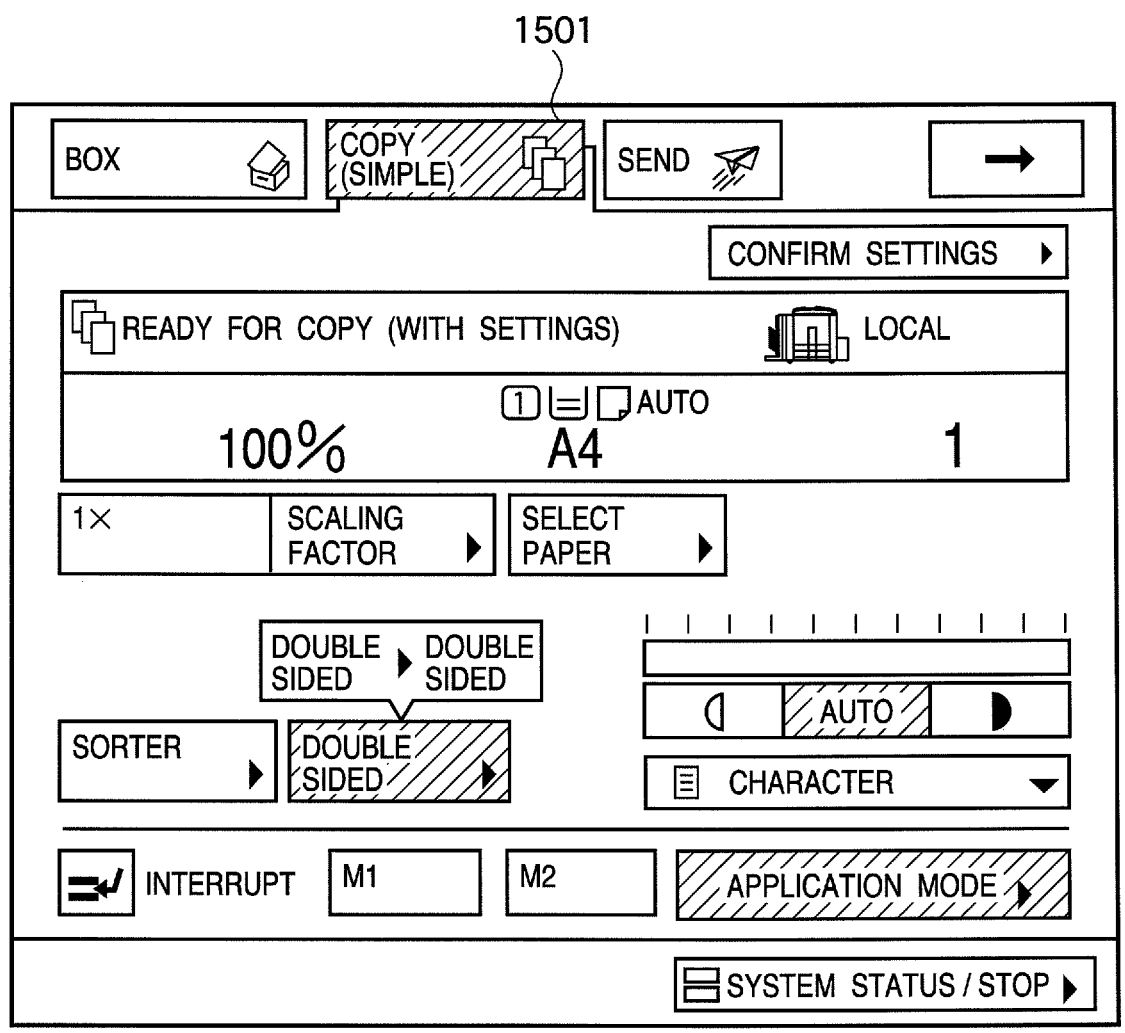
FIG. 15 is a view showing an example of a copy window 1501 of the remote image reading apparatus, i.e., an example of a window developed from the copy initial window shown in FIG. 14.

FIG. 15 is a view showing an example of the copy window 1501 of the remote image reading apparatus, i.e., an example of a window developed from the copy initial window in FIG. 14. This window is displayed when the preset key 1402 is pressed, as described above. On this window, setting is done to execute copy from "double-sided" to "double-sided" in printing and print the print date on the lower side of the printed document.

Figure 16:
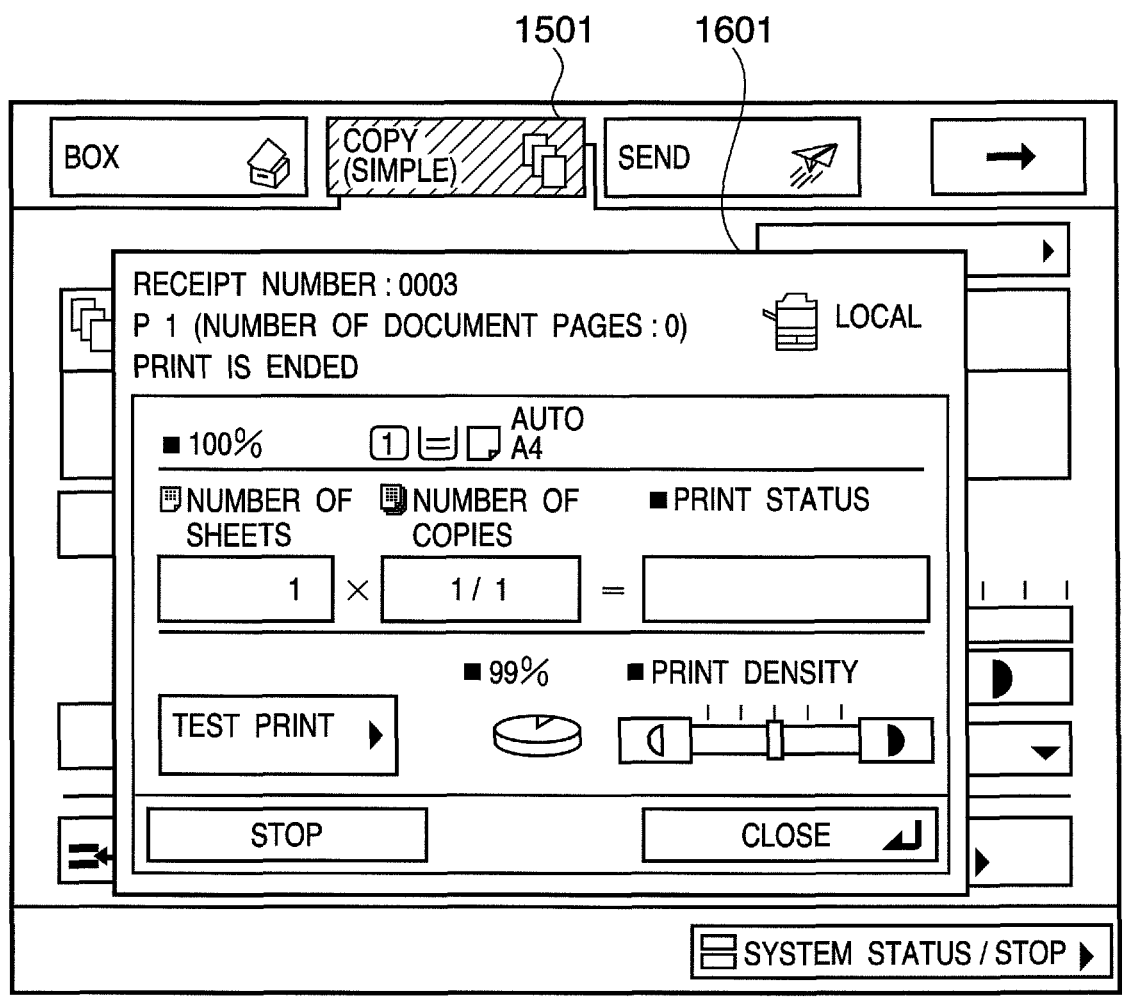
FIG. 16 is a view showing a "copy in progress" window 1601 of the remote image reading apparatus, i.e., an example of a window displayed when copy processing is actually being executed from the copy window.

FIG. 16 is a view showing a "copy in progress" window 1601 of the remote image reading apparatus, i.e., an example of a window displayed when copy processing is actually being executed from the copy window. A dialogue to indicate the number of printed sheets, the number of copies, and the print status in actual copy is displayed on the "copy in progress" window 1601.

Figure 17:
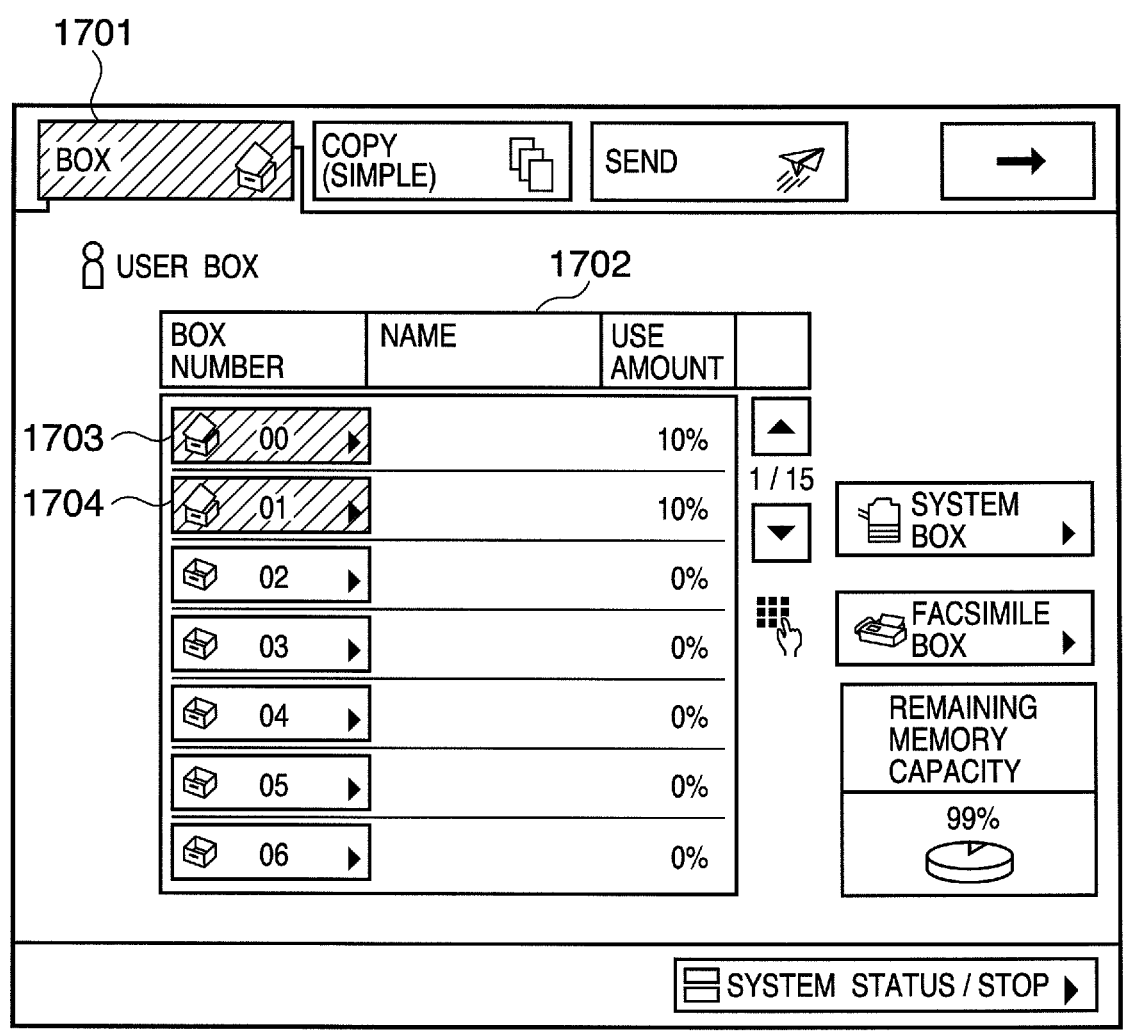
FIG. 17 is a view showing a box list window 1701 of the remote image reading apparatus, i.e., an example of a box initial window displayed when the original apparatus permits access.

FIG. 17 is a view showing a box list window 1701 of the remote image reading apparatus, i.e., an example of a box initial window displayed when the original apparatus permits access. A box has the function of a one-layer folder capable of storing files. A box list 1702 shows the list of boxes. As software keys, box keys 1703 and 1704 to display the box number 00 are displayed. Referring to FIG. 17, the box keys 1703 and 1704 indicate that the boxes store access-permitted information.

Figure 18:
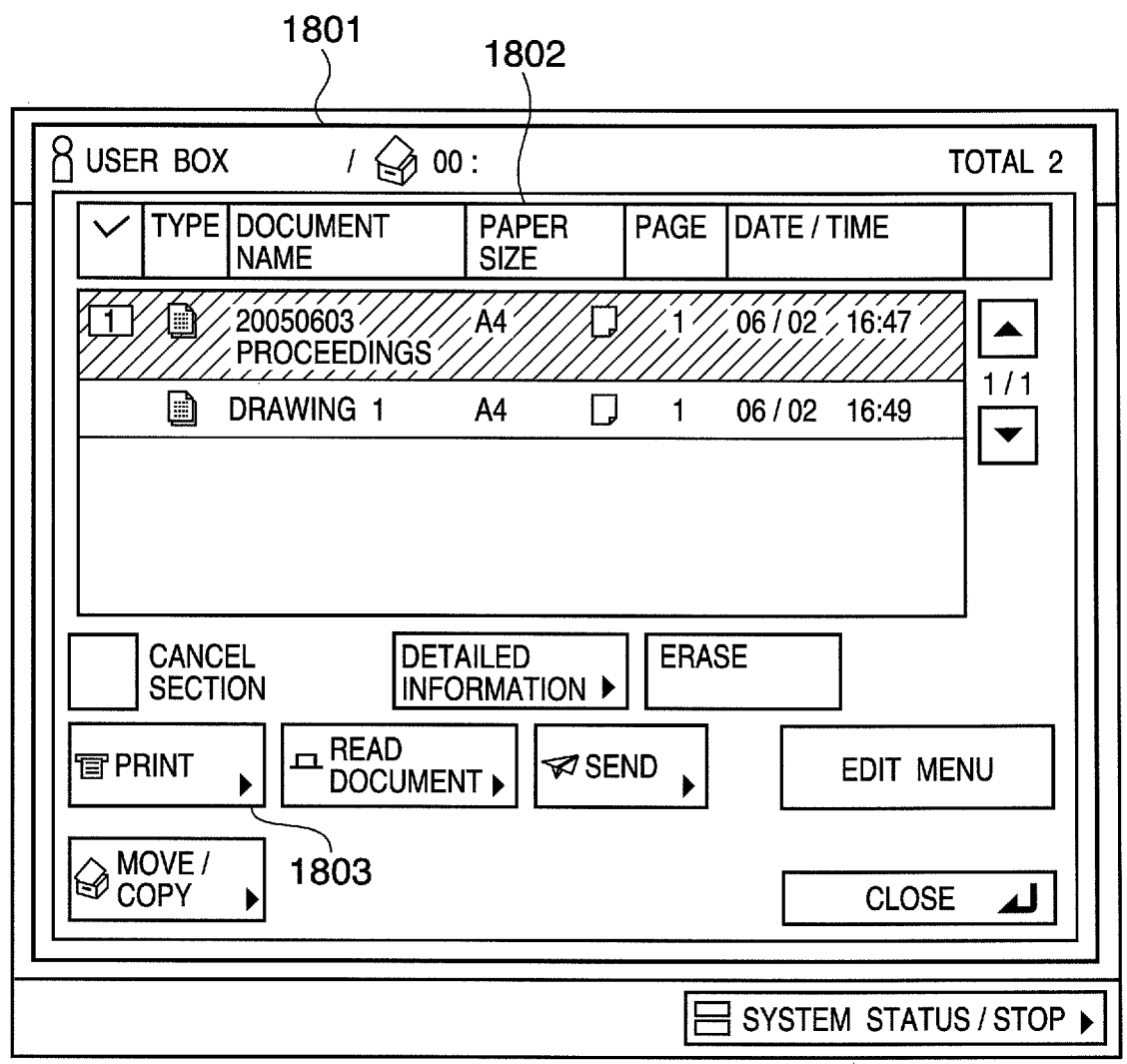
FIG. 18 is a view showing a file list window 1801 in a box of the remote image reading apparatus, i.e., an example of a window that lists files in a box.

FIG. 18 is a view showing a file list window 1801 in a box of the remote image reading apparatus, i.e., an example of a window that lists files in a box. A file list 1802 shows the list of files. In the file list 1802, one or a plurality of files can be selected. In the window example of this embodiment, a document titled "20050603 Proceedings" is selected from the file list 1802, and a print key 1803 as a software key is pressed to display a print start window. A red mark in the file list window 1801 indicates that access-permitted information is stored.

Figure 19:
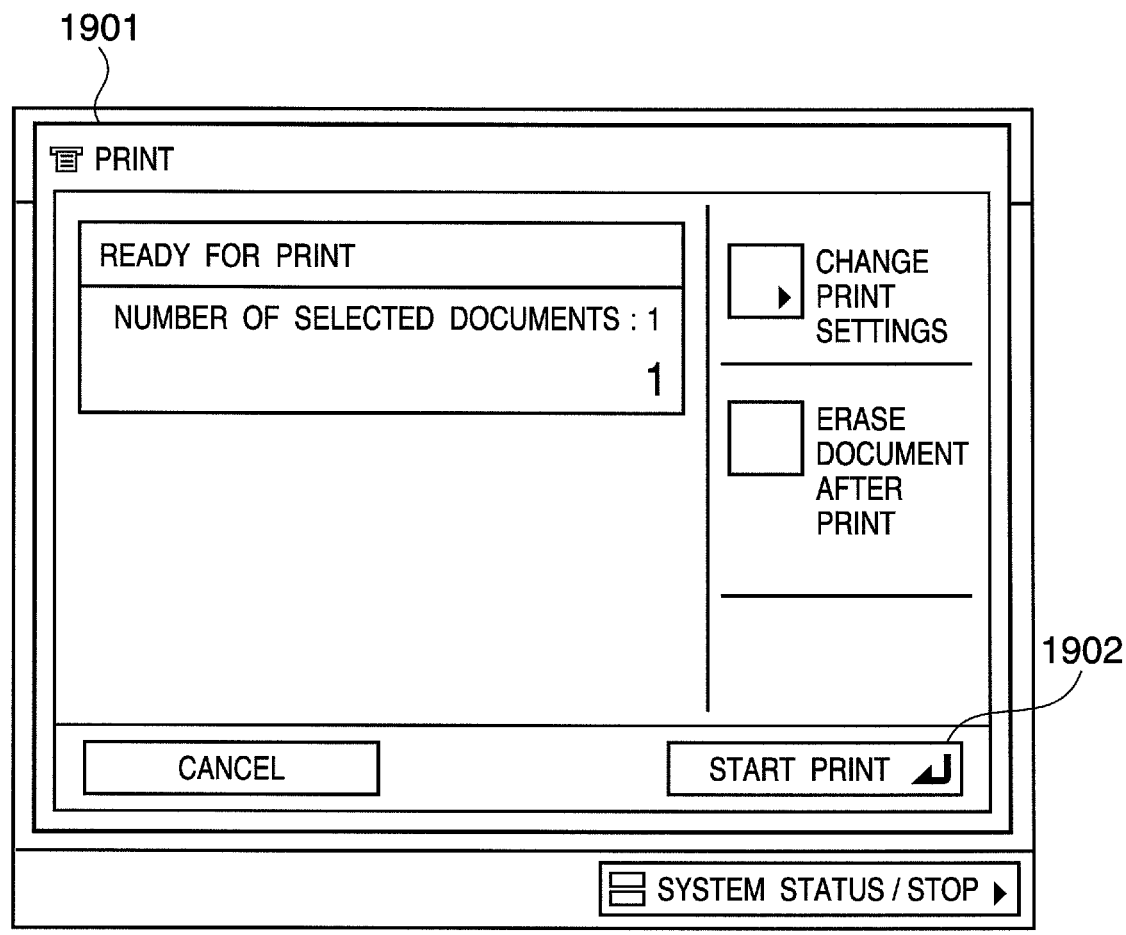
FIG. 19 is a view showing a file print window 1901 in the box of the remote image reading apparatus, i.e., an example of a window before a document is selected from the file list window 1801 in the box and printed.

FIG. 19 is a view showing a file print window 1901 in the box of the remote image reading apparatus, i.e., an example of a window before a document is selected from the file list window 1801 in the box and printed. To start print on the file print window 1901 in the box, the user presses a print start key 1902 as a software key. Then, print starts.

FIG. 20 is a view showing an example of a "print in progress" window 2001 of the remote image reading apparatus. A dialogue to indicate the number of printed sheets, the number of copies, and the print status in print is displayed on this window.

Figure 21:
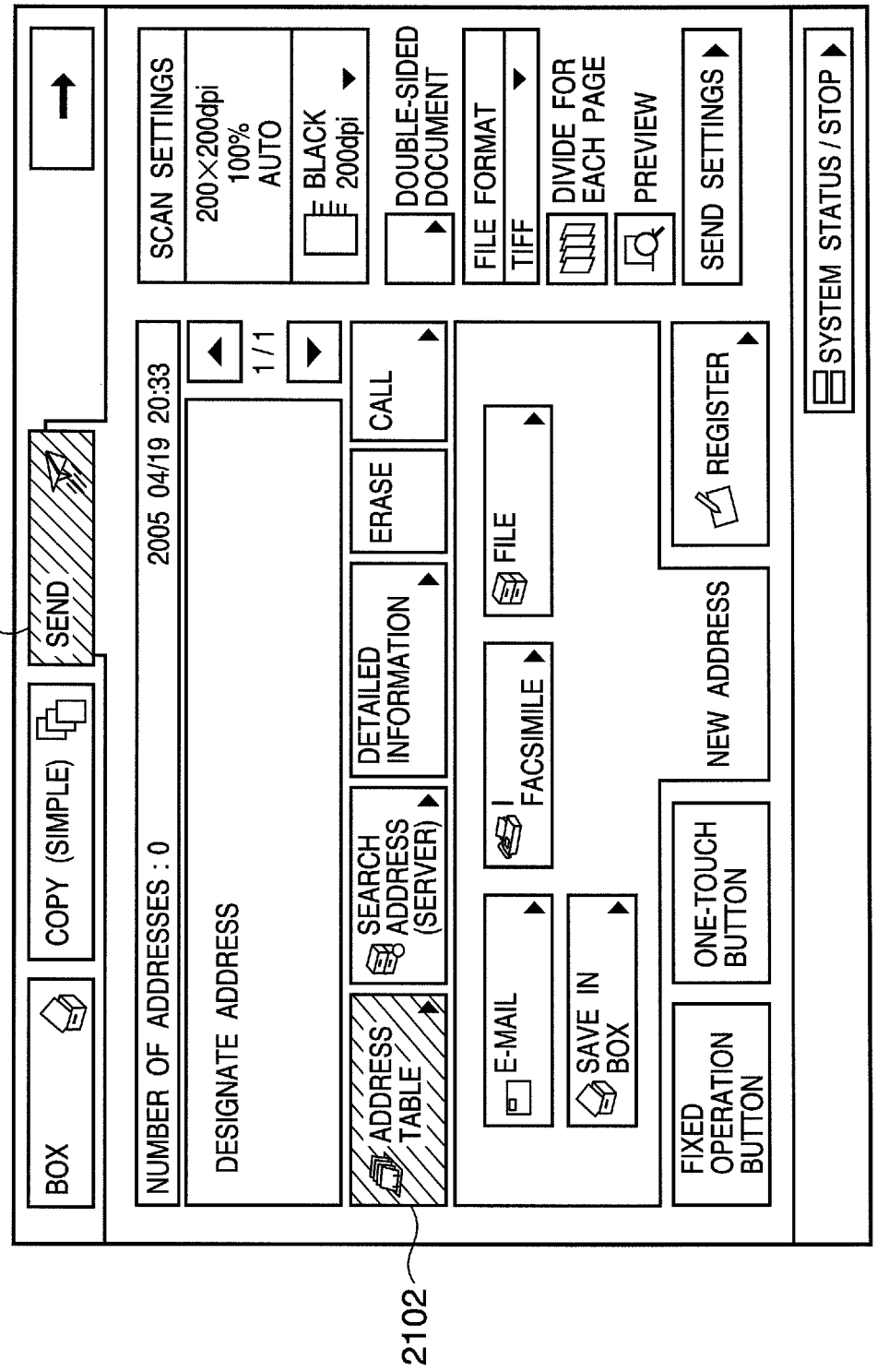
FIG. 21 is a view showing a send window 2101 of the remote image reading apparatus, i.e., an example of a send initial window displayed when access is permitted.

FIG. 21 is a view showing a send window 2101 of the remote image reading apparatus, i.e., an example of a send initial window displayed when access is permitted. On the send window 2101 in FIG. 21, mail and facsimile send is possible. An address table key 2102 as a software key to display a window 2201 that displays an e-mail address table (to be described later).

FIG. 22 is a view showing an example of the window 2201 that displays an e-mail address table of the remote image reading apparatus. A list box 2203 displays members belonging to the address table.

Figure 23:
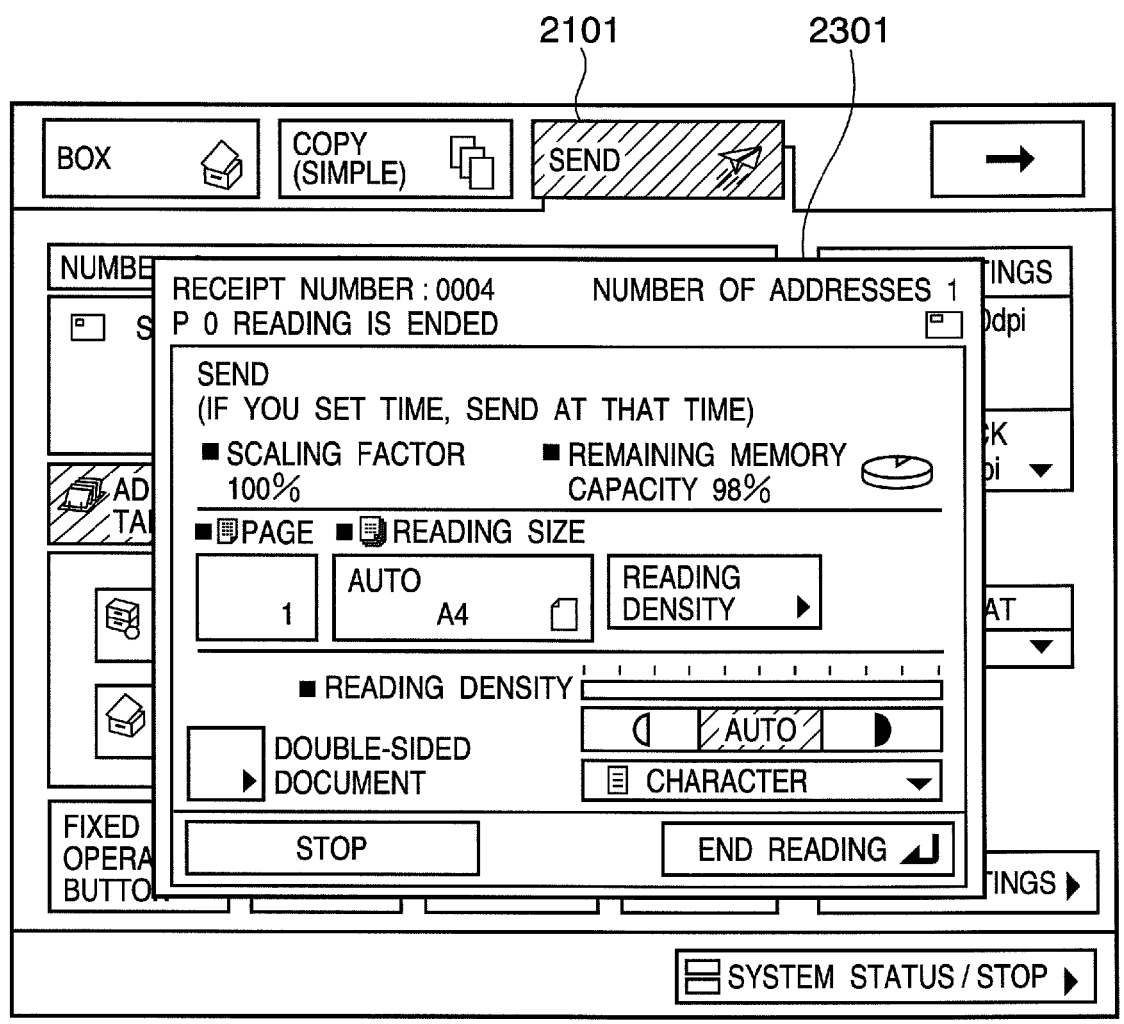
FIG. 23 is a view showing an example of a window 2301 that displays the in-progress state of e-mail send of the remote image reading apparatus.

FIG. 23 is a view showing an example of a window 2301 that displays the in-progress state of e-mail send of the remote image reading apparatus. Pieces of information including the page, reading size, and reading density are displayed on the window.

Figure 24:
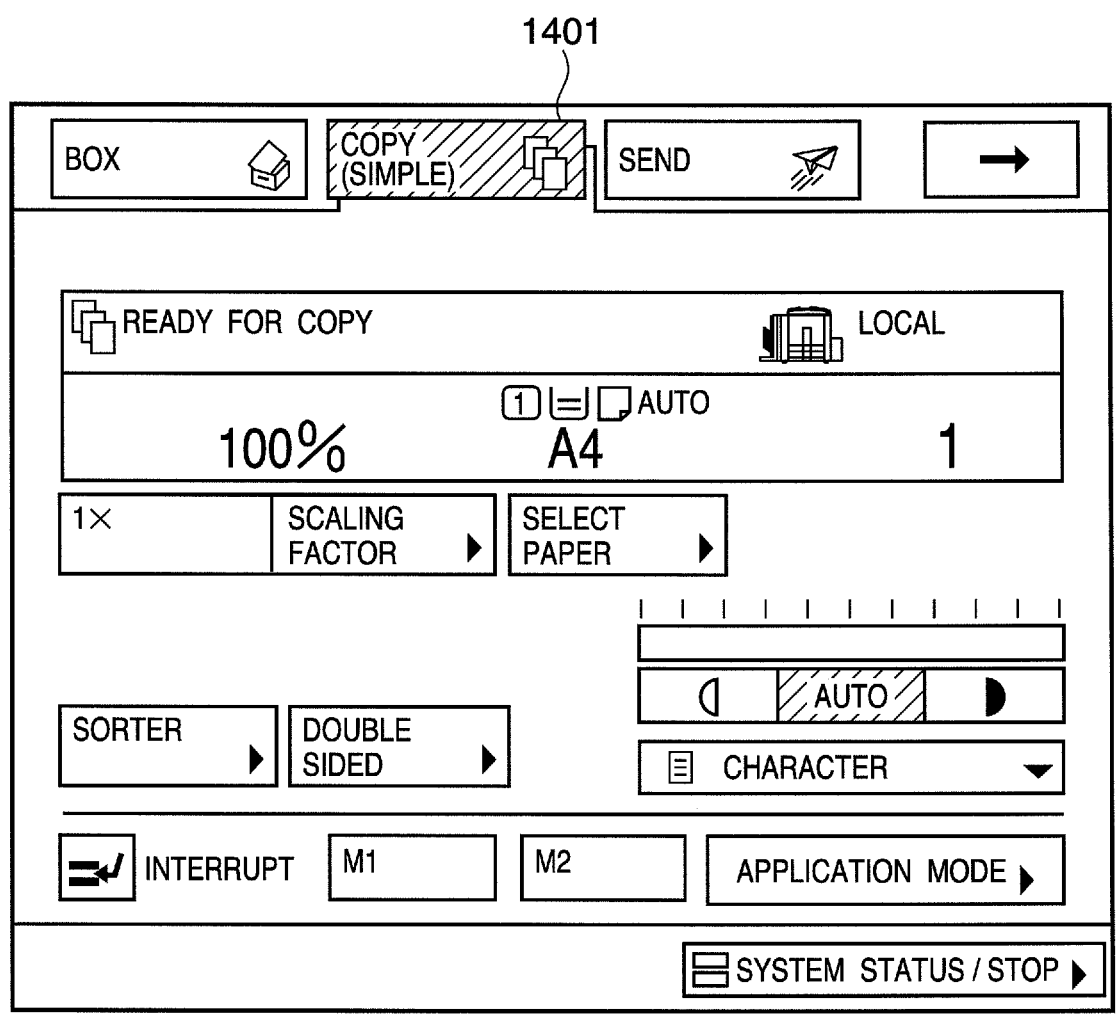
FIG. 24 is a view showing an example of the copy initial window 1401 of the remote image reading apparatus.

FIG. 24 is a view showing an example of the copy initial window 1401 of the remote image reading apparatus. FIG. 24 shows an example of the copy initial window displayed when access information acquisition has failed. The layout is the same as in FIG. 14.

Figure 25:
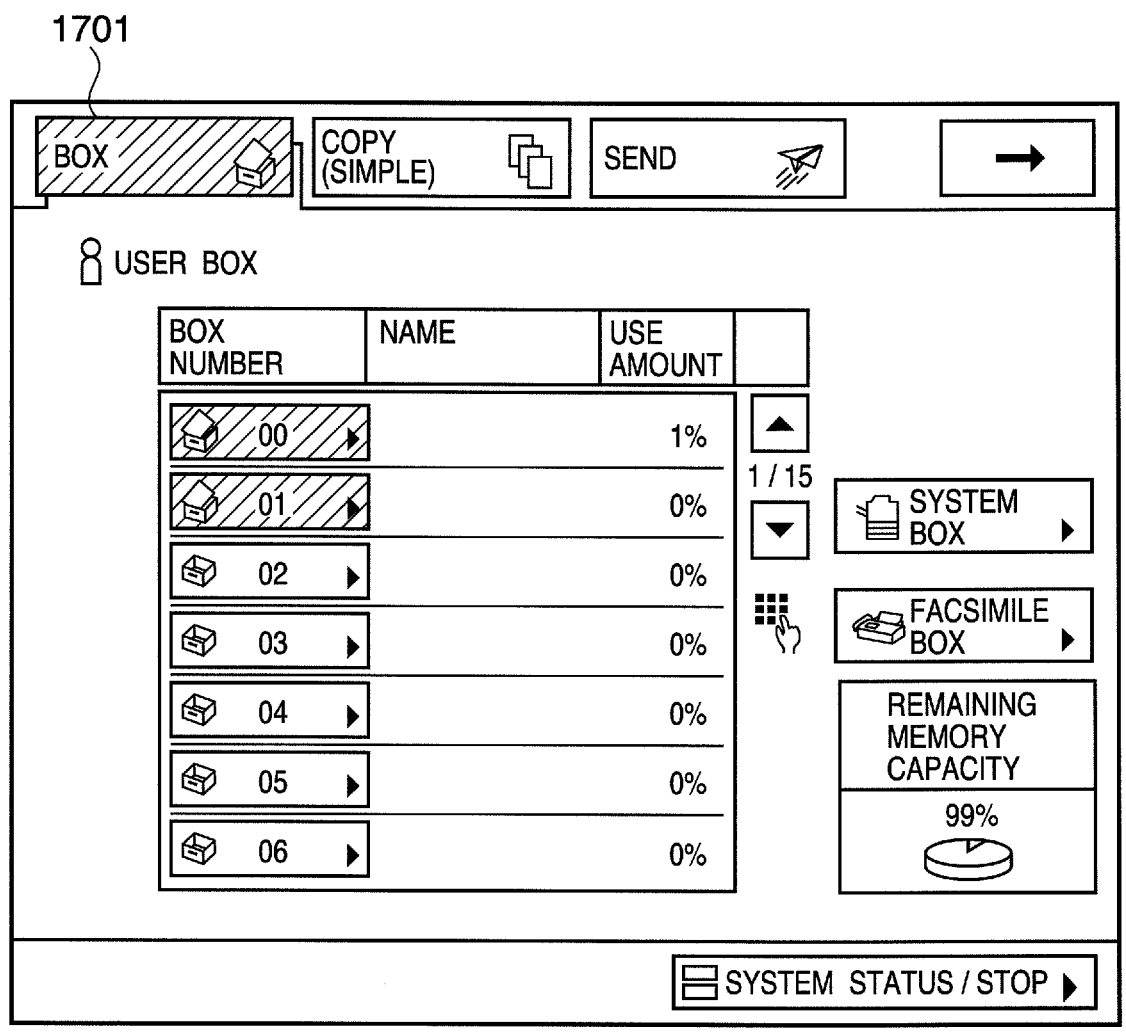
FIG. 25 is a view showing an example of the box initial window 1701 of the remote image reading apparatus.

FIG. 25 is a view showing an example of the box initial window 1701 of the remote image reading apparatus. FIG. 25 shows an example of the box initial window displayed when access information acquisition has failed. The layout is the same as in FIG. 17.

Figure 26:
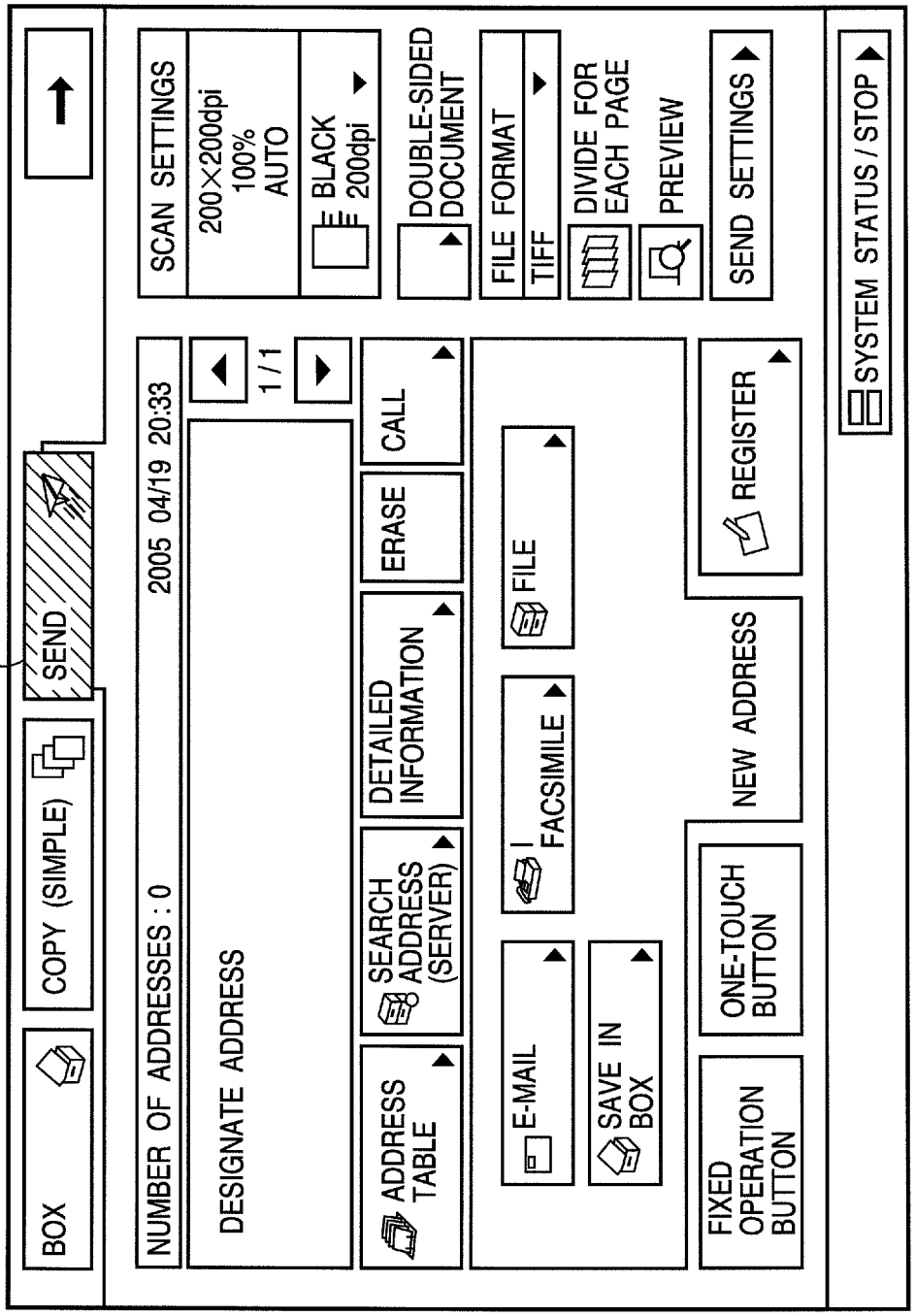
FIG. 26 is a view showing an example of the send initial window 2101 of the remote image reading apparatus.

FIG. 26 is a view showing an example of the send initial window 2101 of the remote image reading apparatus. FIG. 26 shows an example of the send initial window displayed when access information acquisition has failed. The layout is the same as in FIG. 21.

The use window group in the "remote" image reading apparatus has been described above with reference to FIGS. 12 to 26.

The structures of piece of information necessary in this embodiment will be described next schematically with reference to FIGS. 27 to 34.

FIG. 27 is a view schematically showing an example of the structure of the user information 402.

Referring to FIG. 27, user information 2701 is data used on the user authentication window shown in FIG. 5. A system user ID 2702 is the identifier of internal data of user information. A user ID 2703 stores an ID to specify a user. A password 2704 stores a password to be used to authenticate a user ID.

FIG. 28 is a view schematically showing an example of the structure of the box information 403. Referring to FIG. 28, box information 2801 is box information displayed on the window shown in FIG. 17. A box number 2802 is the identifier of a box. A system user ID 2803 is data to specify a user who holds a box. A box name 2804 stores the name of a box. A use amount 2805 stores the data of the use amount of a box.

FIG. 29 is a view schematically showing an example of the structure of the box document information 404. Referring to FIG. 29, box document information 2901 is information of a box document displayed on the window shown in FIG. 18. A box number 2902 is the identifier of a box. A receipt number 2903 is the identifier of a box document. A document name 2904 store the name of a box document. A paper size 2905 stores a paper size. A page 2906 stores a page. A date/time 2907 stores a date/time.

FIG. 30 is a view schematically showing an example of the structure of the address table information 405. Referring to FIG. 30, address table information 3001 is information of an address table displayed in FIG. 22. An address number 3002 is the identifier of an address table. An address Gr 3003 is the identifier of a group to which an address table belongs. A name 3004 stores the name of an address. An address 3005 stores an e-mail address.

FIG. 31 is a view schematically showing an example of the structure of the device information 406. Referring to FIG. 31, device information 3101 is device information displayed in FIG. 8. A device number 3102 is the identifier of a device. A device name 3103 stores a device name. A group number 3104 stores the group number of a device. A domain number 3105 stores the domain number of a device. An IP address 3106 stores the IP address of a device. A security ID 3107 stores the identifier of associated security information.

FIG. 32 is a view schematically showing an example of the structure of the customized information 407. Referring to FIG. 32, customized information 3201 is information displayed in FIG. 9 to set access permission. A system user ID 3202 is an identifier to specify a user who holds this information. A security ID 3203 is an identifier to specify security information associated with this information. A customized ID 3204 is the identifier of customized information settable for a plurality of devise. A display order 3205 stores the display order of windows. A customization type 3206 stores the type of customizable information. A customization state 3207 stores information representing whether to permit access.

FIG. 33 is a view schematically showing an example of the structure of the security information 408. Referring to FIG. 33, security information 3301 is information about security which is displayed and set in FIG. 10. A system user ID 3302 is an identifier to specify a user who holds this information. A security ID 3303 is an identifier to specify security information. A security type 3304 stores a type of how to erase information. An erase time 3305 stores a time unit erase.

FIG. 34 is a view schematically showing an example of the structure of the access permission information 409. Referring to FIG. 34, access permission information 3401 is information about an access permission key displayed in FIG. 11. A system user ID 3402 is an identifier to specify a user who holds this information. A security ID 3403 is an identifier to specify security information. An access permission key 3404 stores an access permission key for access from a "remote" image reading apparatus. A type 3405 stores data to determine whether the access permission has been transmitted or received. A state 3406 is used to manage the transmission and reception states.

The structures of piece of information necessary in this embodiment have been described above schematically with reference to FIGS. 27 to 34.

Two steps according to the embodiment of the present invention will be described next with reference to FIGS. 35 to 38. Of the two steps, the first step is a step of causing the "original" image reading apparatus to permit access from a "remote" image reading apparatus. The second step is a step of causing the "remote" image reading apparatus to execute an operation using access-permitted information in the original image reading apparatus. FIG. 38 is a view for explaining the outline of processing in an information processing system comprising the image reading apparatus according to the embodiment of the present invention. Referring to FIG. 38, an original image reading apparatus 3801 and a remote image reading apparatus 3802 are connected to each other through a network 3803. The flowcharts shown in FIGS. 35 to 37 and the system configuration shown in FIG. 38 will be referred to below.

FIG. 35 is a flowchart for explaining an operation of causing the "original" image reading apparatus to set access information permission from the remote" image reading apparatus. The procedures shown in FIG. 35 are executed by the control unit 401.

First, when the controller unit 100 in the original image reading apparatus 3801 is activated, the control unit 401 displays the user authentication window 501 described in FIG. 5 (step S3501). The control unit 401 executes user authentication (step S3502). User authentication is done by comparing data input to the user ID input field 504 on the user authentication window 501 with the user ID 2703 and data input to the password input field 505 with the password 2704.

If user authentication has been done successfully in step S3502 (YES), the flow advances to step S3503. If user authentication has failed (NO), the flow returns to step S3501 to promote the user to input correct user ID and password again.

In step S3503, the management menu 601 is displayed. In step S3504, when the remote access permission key 602 on the management menu 601 is pressed, the flow advances to step S3505.

In step S3505, the remote access permission menu 701 is displayed. In step S3506, when the remote access permission set key 702 on the remote access permission menu 701 is pressed, the flow advances to step S3507.

In step S3507, the device access permission window 801 is displayed. In step S3508, a device is selected from the device selection list 802 on the device access permission window 801. When the "next" key 808 is pressed, the device information 3101 is updated, and the flow advances to step S3509.

In step S3509, the access permission information setting list window 901 is displayed. In step S3510, pieces of information to be subjected to access permission are set by setting ON/OFF on the access permission information setting list window 901. When the "next" key 909 is pressed, the customized information 3201 is updated, and the flow advances to step S3511.

In step S3511, the security rule window 1001 is displayed. In step S3512, the "erase upon logout" key 1002 or the "erase after predetermined time" key 1003 and time input field 1004 are set to set automatic erase on the "remote" image reading apparatus. When the "OK" key 1007 on the security rule window 1001 is pressed, the security information 3301 is updated, the access permission information 3401 is added, and the flow advances to step S3513.

In step S3513, the access permission key 3404 generated on the basis of the access permission information 3401 is displayed on the access key permission window 1101. In step S3514, the customized information 3201, security information 3301, and access permission information 3401 are transmitted to a device selected on the basis of the device information 3101.

The step of causing the "remote" image reading apparatus 3802 to perform an operation using access-permitted information of the "original" image reading apparatus 3801 will be described next with reference to FIGS. 36 and 37.

FIG. 36 is a flowchart for explaining processing procedures using access-permitted information in the "remote" image reading apparatus 3802. The processing procedures shown in FIG. 36 are executed by the control unit 401. Processing in steps S3601 and S3602 in the flowchart shown in FIG. 36 is the same as that in steps S3501 and S3502, and a description thereof will be omitted.

In step S3603, an access permission key is received, and it is determined whether reception has successfully been done. If reception is successful (YES), access-permitted information is used, and the flow advances to step S3604. If reception has failed (NO), the flow advances to step S3607. In this case, it is determined that the access-permitted information cannot be received, and the normal initial window of the image reading apparatus is displayed.

In step S3604, the access permission authentication window 1201 is displayed. In step S3605, authentication and acquisition of access-permitted information are executed on the access permission authentication window 1201, and it is determined whether authentication and acquisition have successfully been done. In authentication processing, the user ID and password input in the access permission authentication window are compared with data in the "original" image reading apparatus, and the access permission key is compared with data in the "remote" image reading apparatus.

If authentication has been done successfully (YES), access-permitted information is acquired from the "original" image reading apparatus (step S3606). If authentication has failed (NO), the flow advances to step S3607.

In step S3607, various kinds of processing are executed. Details of the processing in step S3607 will be described later with reference to the flowchart in FIG. 37.

After the end of the processing in step S3607, the flow advances to step S3608. In step S3608, it is determined whether access-permitted information is received. If access-permitted information is received (YES), the flow advances to step S3609 to delete the access-permitted information. If reception has failed (NO), the processing of this flowchart is ended.

Details of the processing in step S3607 will be described next. FIG. 37 is a flowchart for explaining details of the processing in step S3607 of the flowchart in FIG. 36.

First, it is determined whether processing (in this embodiment, one of copy, box, and send) to be executed in this flowchart is present (step S3701). If processing to be executed is present, one of copy, box, and send is continued. Any other processing may be continued, as a matter of course.

If "YES" is selected, and copy processing is executed, the flow advances to step S3702. In step S3702, it is determined whether access information is present. If access information is present (YES), the copy initial window 1401 with added access information is displayed in step S3703. If no access information is present, a copy initial window 2401 without added access information is displayed in step S3704. In step S3705, copy processing is executed.

If "YES" is selected in step S3701, and box processing is executed, the flow advances to step S3706. In step S3706, it is determined whether access information is present. If access information is present (YES), the box list window 1701 with added access information is displayed in step S3707. If no access information is present (NO), a box initial window 2501 without added access information is displayed in step S3708. In step S3709, box processing is executed.

If "YES" is selected in step S3701, and send processing is executed, the flow advances to step S3710. In step S3710, it is determined whether access information is present. If access information is present (YES), the send list window 2101 with added access information is displayed in step S3711. If no access information is present (NO), a send initial window 2601 without added access information is displayed in step S3712. In step S3713, send processing is executed.

As described above, in this embodiment, setting information that the user normally uses on the image reading apparatus 3801 can be used even in another device (in this embodiment, the image reading apparatus 3802). In addition, the information can automatically be erased on another device. Hence, operability for the user can largely be improved, and operability convenient from the viewpoint of security can be provided.

As described above, according to this embodiment, information of, e.g., an operation environment that is personalized in a given apparatus and handled in another apparatus and remains in it can suitably be deleted so that the operability and security are improved. User information of a specific image reading apparatus can be used even in another image reading apparatus. Hence, information that is usable so far only in a specific image reading apparatus can be used in another image reading apparatus without any cumbersome operation.

According to this embodiment, a mechanism for automatically erasing user information developed in another image reading apparatus can be set. With this arrangement, any omission of erase operation that is manually executed so far can be prevented, and the security can be strengthened. As a result, user information in a specific image reading apparatus can be used safely in another image reading apparatus. In addition, the user information can automatically be deleted from another image reading apparatus after the end of processing. Hence, the cumbersomeness of conventional user operation can be reduced, and the convenience for the user and the security can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-217395, filed on Jul. 27, 2005, which is hereby incorporated by reference herein in its entirety.

What is claimed is:

1. A system including a first image processing apparatus and a second image processing apparatus,
wherein the first image processing apparatus comprises:
 (a) a memory; and
 (b) a hardware processor in communication with the memory, the hardware processor being configured to function as:
  (i) a storage unit for storing an address book in which a plurality of destination addresses are registered, the address book being used when transmitting image data to an external apparatus;
  (ii) a setting unit for setting an erasing condition of the address book to be transmitted to the second image processing apparatus;
  (iii) an issuing unit for issuing an access permission key to permit access from the second image processing apparatus in response to the setting unit setting the erasing condition and does not issue the access permission key in response to the setting unit not setting the erasing condition; and
  (iv) a transmission unit for transmitting the address book stored in the storage unit and the erasing condition set by the setting unit to the second image processing apparatus when the second image processing apparatus accesses the first image processing apparatus using the issued access permission key, and
wherein the second image processing apparatus comprises:
 (a) a memory; and
 (b) a hardware processor in communication with the memory, the hardware processor being configured to function as:

(i) an accessing unit for accessing the first image processing apparatus using the issued access permission key;
(ii) a reception unit for receiving the address book and the erasing condition transmitted by the transmission unit;
(iii) an input unit for inputting image data;
(iv) an execution unit for transmitting the input image data to an external apparatus indicated by a destination address which is selected by a user among the plurality of destination addresses in the address book received by the reception unit; and
(v) an erasing unit for erasing the address book received by the reception unit in accordance with the erasing condition received by the reception unit,
wherein the setting unit is further configured to set, as the erasing condition, a condition for designating a timing for erasing the transmitted address book, and the erasing unit is further configured to erase the received address book at the designated timing.

2. The system according to claim 1, wherein the timing designated in the erasing condition set by the setting unit is a timing that a predetermined period of time is elapsed after the user has operated the second image processing apparatus.

3. The system according to claim 1, wherein the setting unit sets the erasing condition based on a user instruction received via an operation unit provided in the first image processing apparatus.

4. The system according to claim 1, wherein the transmission unit transmits the address book and the erasing condition in accordance with a request from the second image processing apparatus.

5. The system according to claim 4, wherein the setting unit sets a setting indicating whether a usage of the address book stored in the storage unit by another apparatus being different from the first image processing apparatus is permitted or restricted, and when the request is received from the second image processing apparatus, the transmission unit transmits, in a case where the setting set by the setting unit indicates that the usage of the address book is permitted, the address book, and does not transmit, in a case where the setting set by the setting unit indicates that the usage of the address book is restricted, the address book.

6. The system according to claim 4, wherein the setting unit sets device information indicating an apparatus that a usage of the address book stored in the storage unit is permitted, and when the request is received from the second image processing apparatus, the transmission unit transmits, in a case where the device information indicates the second image processing apparatus, the address book, and does not transmit, in a case where the device information does not indicate the second image processing apparatus.

7. The system according to claim 6, wherein the hardware processor of the first image processing apparatus is further configured to function as a permission information transmission unit for transmitting permission information indicating that a usage of the address book stored in the storage unit is permitted to the apparatus indicated by the device information set by the setting unit.

8. The system according to claim 7, wherein the hardware processor of the second image processing apparatus is further configured to function as a permission information reception unit for receiving permission information from the user, and the reception unit receives the address book if the permission information received by the permission information reception unit and the permission information transmitted by the permission information transmission unit are matched.

9. The system according to claim 1, wherein the input unit inputs image data obtained by reading an original document.

10. A controlling method for controlling a system including a first image processing apparatus and a second image processing apparatus, the first image processing apparatus performing the steps of:
(i) storing, in a storage unit, an address book in which a plurality of destination addresses are registered, the address book being used when transmitting image data to an external apparatus;
(ii) setting an erasing condition of the address book to be transmitted to the second image processing apparatus;
(iii) issuing an access permission key to permit access from the second image processing apparatus in response to the erasing condition being set and not issuing the access permission key in response to the erasing condition not being set; and
(iv) transmitting the address book stored in the storage unit and the set erasing condition to the second image processing apparatus when the second image processing apparatus accesses the first image processing apparatus using the issued access permission key, and
the second image processing apparatus performing the steps of:
(i) accessing the first image processing apparatus using the issued access permission key;
(ii) receiving the transmitted address book and the transmitted erasing condition;
(iii) inputting image data;
(iv) transmitting the input image data to an external apparatus indicated by a destination address which is selected by a user among the plurality of destination addresses in the received address book; and
(v) erasing the received address book in accordance with the received erasing condition,
wherein the setting step further includes setting, as the erasing condition, a condition for designating a timing for erasing the transmitted address book, and the erasing step further includes erasing the received address book at the designated timing.

11. An image processing apparatus for communicating with another image processing apparatus, the image processing apparatus comprising:
(a) a memory; and
(b) a hardware processor in communication with the memory, the hardware processor being configured to function as:
(i) a storage unit for storing an address book in which a plurality of destination addresses are registered, the address book being used when transmitting image data to an external apparatus;
(ii) a setting unit for setting an erasing condition of the address book to be transmitted to the another image processing apparatus;
(iii) an issuing unit for issuing an access permission key to permit access from the another image processing apparatus in response to the setting unit setting the erasing condition and does not issue the access permission key in response to the setting unit not setting the erasing condition; and
(iv) a transmission unit for transmitting the address book stored in the storage unit and the erasing condition set by the setting unit to the another image processing apparatus when the another image processing apparatus accesses the image processing apparatus using the issued access permission key, wherein the another image processing apparatus erases the address book transmitted by the transmission unit in accordance with the erasing condition transmitted by the transmission unit, wherein the setting unit is further configured to set, as the erasing condition, a condition for designating a timing for erasing the transmitted address book, and the another image processing apparatus is further configured to erase the received address book at the designated timing.

12. An image processing apparatus for communicating with another image processing apparatus, the image processing apparatus comprising:

(a) a memory; and
(b) a hardware processor in communication with the memory, the hardware processor being configured to function as:
   (i) an accessing unit for accessing another image processing apparatus using an access permission key issued by the another image processing apparatus;
   (ii) a reception unit for receiving an address book in which a plurality of destination addresses are registered and an erasing condition of the address book set by the another image processing apparatus, the address book being used when transmitting image data to an external apparatus, wherein the access permission key is issued by the another image processing apparatus in response to the erasing condition being set and is not issued in response to the erasing condition not being set;
   (iii) an input unit for inputting image data;
   (iv) an execution unit for transmitting the input image data to an external apparatus indicated by a destination address which is selected by a user among the plurality of destination addresses in the address book received by the reception unit; and
   (v) an erasing unit for erasing the address book received by the reception unit in accordance with the erasing condition received by the reception unit;

wherein the another image processing apparatus is further configured to set, as the erasing condition, a condition for designating a timing for erasing the transmitted address book, and the erasing unit is further configured to erase the received address book at the designated timing.

13. A method according to claim 10, wherein the timing designated in the erasing condition set by the setting step is a timing that a predetermined period of time is elapsed after the user has operated the second image processing apparatus.

14. An apparatus according to claim 11, wherein the timing designated in the erasing condition set by the setting unit is a timing that a predetermined period of time is elapsed after the user has operated the another image processing apparatus.

15. An apparatus according to claim 12, wherein the timing designated in the erasing condition set by the another image processing apparatus is a timing that a predetermined period of time is elapsed after the user has operated the image processing apparatus.

* * * * *